(12) United States Patent
Jamali et al.

(10) Patent No.: US 11,803,077 B2
(45) Date of Patent: Oct. 31, 2023

(54) GRADIENT-INDEX LIQUID CRYSTAL DEVICE WITH MASKED ELECTRODE BOUNDARY

(71) Applicant: Meta Platforms Technologies, LLC, Menlo Park, CA (US)

(72) Inventors: Afsoon Jamali, Seattle, WA (US); Changwon Jang, Issaquah, WA (US); Sandro Pintz, Menlo Park, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 179 days.

(21) Appl. No.: 17/173,177

(22) Filed: Feb. 10, 2021

(65) Prior Publication Data

US 2022/0252931 A1    Aug. 11, 2022

(51) Int. Cl.
  *G02F 1/1335* (2006.01)
  *G02F 1/1343* (2006.01)

(52) U.S. Cl.
  CPC .. *G02F 1/133512* (2013.01); *G02F 1/133526* (2013.01); *G02F 1/134309* (2013.01)

(58) Field of Classification Search
  None
  See application file for complete search history.

(56) References Cited

U.S. PATENT DOCUMENTS

| | | |
|---|---|---|
| 2012/0293735 A1 | 11/2012 | Jung et al. |
| 2015/0077669 A1 | 3/2015 | Wu |
| 2016/0085118 A1 | 3/2016 | Lee |
| 2018/0157108 A1* | 6/2018 | Gu ............... G02F 1/133621 |
| 2019/0121192 A1 | 4/2019 | Li et al. |

OTHER PUBLICATIONS

International Search Report and Written Opinion for International Application No. PCT/US2022/014152 dated May 3, 2022, 11 pages.
Lu, T., et al., "Pixel-level fringing-effect model to describe the phase profile and diffraction efficiency of a liquid crystal an silicon device," Applied Optics, vol. 54, No. 19, pp. 5903-5910, Jul. 1, 2015 (8 pages).
Gu, L., et al., "High-spatial-frequency liquid crystal phase gratings with double-sided striped electrodes," Proceedings of SPIE, vol. 5741, Emerging Liquid Crystal Technologies, pp. 180-189, Apr. 12, 2005 (10 pages).
Efron, U., et. al, "Fringing-field effect in liquid-crystal beam-steering devices: an approximate analytical model," Journal of the Optical Society of America A, vol. 21, No. 10, pp. 1996-2008, Oct. 1, 2004 (13 pages).

* cited by examiner

*Primary Examiner* — Thanh Nhan P Nguyen
(74) *Attorney, Agent, or Firm* — MILLBURN IP PLLC

(57) ABSTRACT

A device includes a liquid crystal ("LC") layer having a gradient refractive index distribution. The device also includes an electrode layer coupled to the LC layer. The electrode layer includes a plurality of electrodes separated by one or more gaps masked by a light shielding material.

20 Claims, 24 Drawing Sheets

GRADIENT-INDEX LIQUID CRYSTAL DEVICE WITH MASKED ELECTRODE BOUNDARY

TECHNICAL FIELD

The present disclosure generally relates to optical devices and, more specifically, to a gradient-index liquid crystal device with masked electrode boundary.

BACKGROUND

Liquid crystals ("LCs"), as well-known functional materials, have become increasingly popular in applications for information processing due to their advantages of low cost, low power consumption, and simple preparation. Gradient-index ("GRIN") liquid crystal ("LC") devices provide optical effects based on a gradient distribution of the refractive index of LCs. GRIN LC devices are featured with flat surfaces, light weight, low power consumption, switchable optical effects, etc., and have numerous applications in a large variety of fields. For example, GRIN LC devices may function as imaging devices (e.g., lenses) or beam steering devices for target (or object) tracking (e.g., eye tracking), three-dimensional ("3D") imaging and sensing, free-space optical communications countermeasures, directed energy systems, fiber optic switching devices, lithography, 3D printing, etc. GRIN LC devices functioning as imaging devices (e.g., lenses) may be configured with aspherical lens profiles, which are attractive for aberration correction and ophthalmic applications.

SUMMARY OF THE DISCLOSURE

One aspect of the present disclosure provides a device. The device includes a liquid crystal ("LC") layer having a gradient refractive index distribution. The device also includes an electrode layer coupled to the LC layer. The electrode layer includes a plurality of electrodes separated by one or more gaps masked by a light shielding material.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
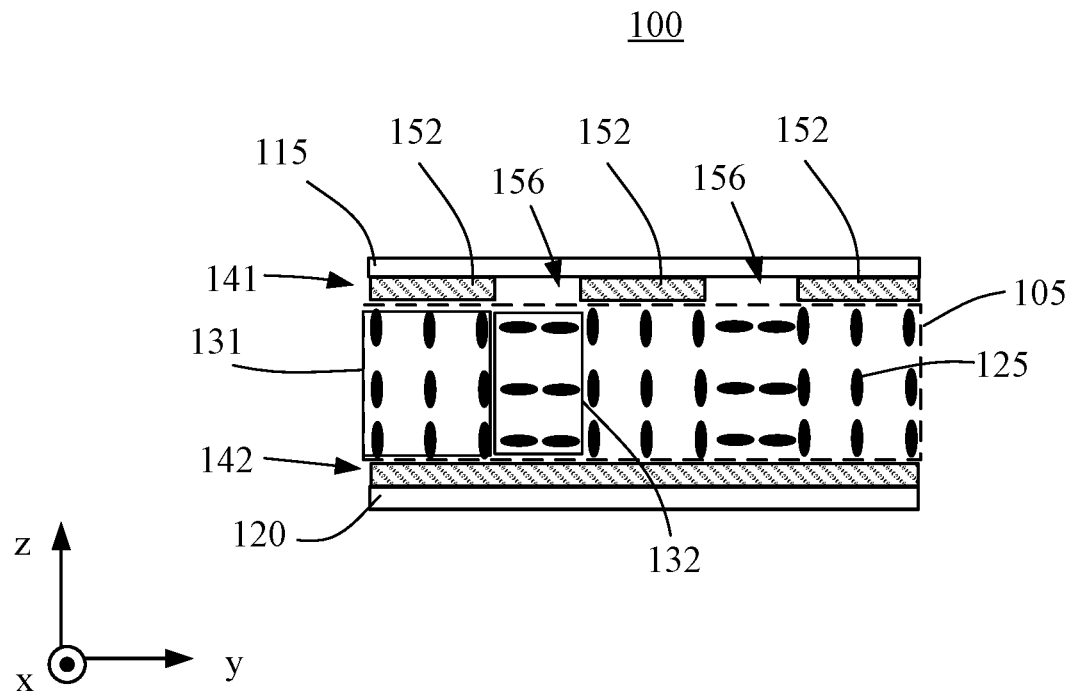
FIG. 1A schematically illustrates a diagram of a conventional gradient index ("GRIN") liquid crystal ("LC") device.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or exemplary configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film," "layer," "coating," or "plate" may include rigid or flexible, self-supporting or free-standing film, layer, coating, or plate, which may be disposed on a supporting substrate or between substrates. The terms "film, " "layer," "coating," and "plate" may be interchangeable. In the present disclosure, an angle of a beam (e.g., a diffraction angle of a diffracted beam, an incidence angle of an incident beam, or a steering angle of an incident beam) with respect to a normal of a surface can be defined as a positive angle or a negative angle, depending on the positional relationship between a propagation direction of the beam and the normal of the surface. For example, when the propagation direction of the beam is clockwise from the normal, the angle of the propagation direction may be defined as a positive angle, and when the propagation direction of the beam is counterclockwise from the normal, the angle of the propagation direction may be defined as a negative angle.

The wavelength ranges, spectra, or bands mentioned in the present disclosure are for illustrative purposes. The disclosed optical device, system, element, assembly, and method may be applied to a visible wavelength range, as well as other wavelength ranges, such as an ultraviolet ("UV") wavelength range, an infrared ("IR") wavelength range, or a combination thereof.

FIG. 1A schematically illustrates a y-z cross-sectional view of a conventional gradient-index ("GRIN") liquid crystal ("LC") device 100. The GRIN LC device 100 may be an LC phase grating 100, e.g., a binary LC phase grating. The LC phase grating 100 is illustrated as an exemplary GRIN LC device for explaining the fringing field effect in the GRIN LC devices. The LC phase grating 100 may include a first substrate 115, a second substrate 120 disposed opposite to the first substrate 115. An LC layer 105 including LC molecules 125 may be disposed between the first substrate 115 and the second substrate 120 to form an LC cell. The LC phase grating 100 may include a first electrode layer 141 disposed at the first substrate 115, and a second substrate 142 disposed at the second substrate 120. The LC phase grating 100 may also include one or more alignment layers (not shown) disposed at one or both of the upper and lower surfaces of the LC layer 105, and may be in contact with the LC molecules 125. Each alignment layer may be disposed between the electrode layer 141 or 142 and the LC layer 105. For example, two alignment layers may provide initial homogenous alignments (in a y-axis direction) to the LC molecules 125.

The first electrode layer 141 may be a patterned electrode layer including a plurality of electrodes 152 (also referred to as patterned electrodes 152). The second electrode layer 142 may be a planar electrode layer. The plurality of patterned electrodes 152 may be separated by gaps 156. When voltages are supplied to the first electrode layer 141 and/or the second electrode layer 142 (e.g., the second electrode layer 142 may be grounded), a vertical electric field may be generated between the first electrode layer 141 and the second electrode layer 142 in the LC layer 105. The vertical electric field may be relatively strong in central regions 131 between the facing electrodes (e.g., the patterned electrode 152 and corresponding portions of the second electrode layer 142 facing the patterned electrodes 152). The LC molecules 125 within the central regions 131 may tend to be oriented to be aligned along the direction of the vertical electric field. In lateral regions 132 of the LC layer 105 between neighboring patterned electrodes 152, the vertical electric field may be relatively weak, and the LC molecules 125 within the lateral regions 132 may tend to be oriented along the initial homogenous (or horizontal) alignment direction defined by the alignment layer. Fringing fields from the boundaries (or edges) of the patterned electrodes 152 may extend into the lateral regions 132 to affect the orientations of the LC molecules 125 within the lateral regions 132, such as those located close to the boundaries of the patterned electrodes 152. As a result, the orientations of the LC molecules 125 within the lateral region 132 may be affected or distorted, which may result in alignment distortion. A light transmitted through the lateral regions 132 may exhibit light distortion. The light distortion may affect the overall optical performance of the LC phase grating 100. It is noted that although an LC phase grating is used as an example to explain the fringing field effect that causes optical artifacts in GRIN LC devices, the fringing field effect that causes optical artifacts may occur in other types of optical devices (e.g., other GRIN LC devices) in which patterned electrodes (or pixelated electrodes) are used.

Figure 1B:
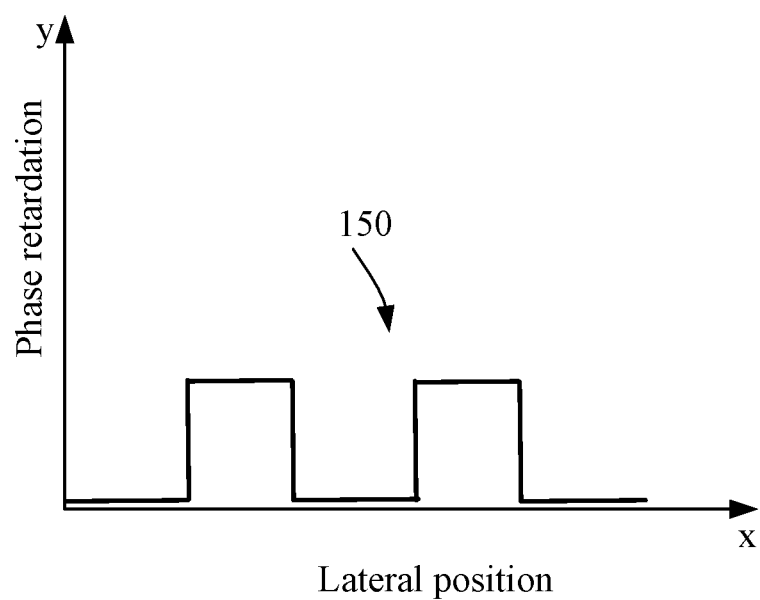
FIG. 1B illustrates a phase profile provided by the GRIN LC device shown in FIG. 1A when a fringing field effect is weak.

FIG. 1B illustrates a phase profile 150 provided by the LC phase grating 100 shown in FIG. 1A, in which the fringing field effect is not accounted for, for example, when the fringing field is substantially weak and negligible, or when the fringing field effect does not exist in theory. The horizontal axis and the vertical axis represent lateral position and phase retardation, respectively. As shown in FIG. 1B, the phase profile 150 is a periodic square waveform having sharp discontinuities in phase transition regions (referred to as flyback regions), in which the phase varies between the minimum value and the maximum value within an infinitesimal distance.

Figure 1C:
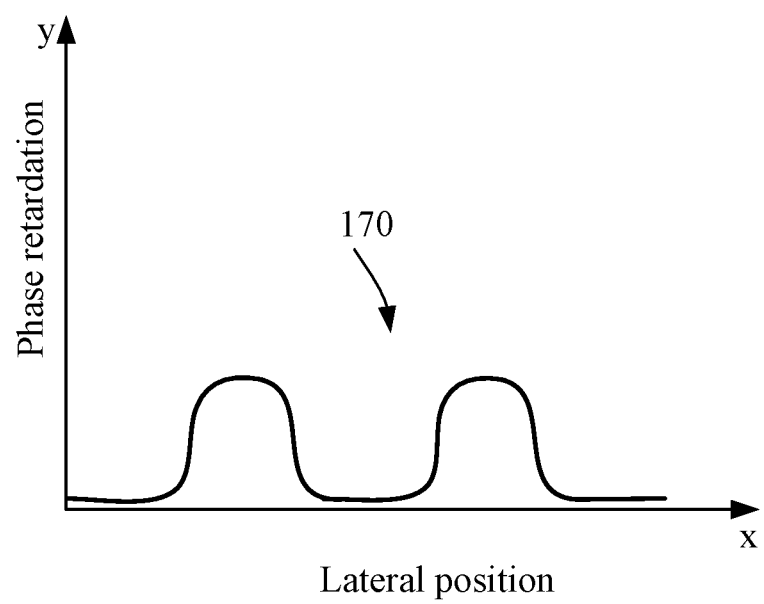
FIG. 1C illustrates a phase profile provided by the GRIN LC device shown in FIG. 1A when a fringing field effect is strong.

FIG. 1C illustrates another phase profile 170 provided by the LC phase grating 100 shown in FIG. 1A, in which the fringing field effect is strong. That is, the fringing field effect is not negligible and causes optical artifacts, which may be the case in many practical applications. As shown in FIG. 1C, the phase profile 170 exhibits broadening of the phase profile in the phase transition regions, such that the phases are no longer transitioned abruptly. The fringing field effect may become more significant as the grating period is reduced. The fringing effect causes optical artifacts, reduces the attainable diffraction efficiency and the maximum deflection angle, thereby degrading the optical performance of the LC phase grating 100.

Fresnel LC lenses is another type of GRIN LC devices that may be configured for optical imaging applications. A Fresnel LC lens may include a plurality of Fresnel zones (or segments, resets). The Fresnel LC lens may include two substrates, an LC layer disposed between the two substrates, and a plurality of patterned electrodes disposed on one or both substrates. The plurality of electrodes may form, together with other components of the Fresnel LC lenses, the plurality of Fresnel zones. A lens phase profile may be formed in the LC layer when suitable driving voltages are applied to the electrodes. Similarly, due to the fringing field effect at boundaries of the patterned electrodes, the phase profile in the phase transition regions (or flyback regions) of the LC layer may suffer from broadening, similar to the phase broadening in the LC phase grating 100 as shown in FIG. 1C. The fringing field effect may result in Fresnel boundary artifacts (e.g., light scattering), which may degrade the image quality provided by the Fresnel LC lens.

The present disclosure provides a GRIN LC device with masked electrode boundaries (e.g., gaps between neighboring patterned electrodes), through which the optical artifacts caused by the fringing field effect at edges or boundaries of patterned electrodes may be reduced or suppressed, and the optical performance of the GRIN LC device may be enhanced. The present disclosure also provides a method for reducing or suppressing optical artifacts at the boundaries of the patterned electrodes by masking the boundaries of the patterned electrodes.

As discussed above, in conventional GRIN LC devices, the gaps between neighboring patterned electrodes in a patterned electrode layer may be unmasked. For example, the gaps may be filled with air, and may be substantially transparent to an input light. Due to the fringing field effect, the phase profile provided by the conventional GRIN LC devices may be broadened in the phase transition regions (e.g., within the lateral regions), and the input light propagating through the lateral regions of the LC layer at locations corresponding to the gaps may experience a distortion (e.g., scattering). This may result in degradation in the optical performance of the GRIN LC device when the distorted light is output from the GRIN LC device to, e.g., eyes of a human.

In the present disclosure, the inventors have discovered that by masking the gaps between neighboring patterned electrodes with a light shielding material, which significantly reduces the light transmittance of the GRIN LC devices at lateral regions of the LC layer at locations corresponding to the gaps, even though an overall light transmittance of disclosed GRIN LC devices may be slightly reduced, the optical artifacts (e.g., light scattering) caused by the fringing field effect may be significantly reduced or suppressed in an output light of the disclosed GRIN LC device. In some embodiments, the light shielding material may be disposed at a light input side of the GRIN LC devices and configured to significantly block an input light from being transmitted through the lateral regions of the LC layer at locations corresponding to the gaps via, for example, absorption and/or reflections, etc. Thus, less input light may be transmitted through the lateral regions of the LC layer, and the light distortion (e.g., scattering) caused by the fringing field effect may be significantly reduced in an output light of the GRIN LC devices.

In some embodiments, the light shielding material may be disposed at a light output side of the GRIN LC devices. The input light transmitted through the lateral regions of the LC layer at locations corresponding to the gaps may experience a distortion caused by the fringing field effect. The light shielding material may be configured to significantly attenuate or block a distorted light (e.g., scattered light) output from the lateral regions of the LC layer at locations corresponding to the gaps, via, for example, absorption and/or reflections, etc. Thus, the light distortion (e.g., scattering) caused by the fringing field effect may be significantly reduced in an output light of the GRIN LC devices. In some embodiments, the light shielding material may be disposed at both the light input side and the light output side of the GRIN LC devices, and configured to significantly block an input light from being transmitted through the lateral regions of the LC layer and significantly attenuate or block a distorted light (e.g., scattered light) output from the lateral regions of the LC layer. Thus, the light distortion (e.g., scattering) caused by the fringing field effect may be significantly reduced in an output light of the GRIN LC devices. In the disclosed embodiments, the light shielding material may be configured to significantly reduce the amount (e.g., energy) of the distorted light output from the GRIN LC devise. In other words, the light shielding material may be configured to significantly reduce the light distortion (e.g., scattering) caused by the fringing field effect in an output light of the GRIN LC devices. Compared to conventional GRIN LC devices, the light distortion due to the fringing field effect in the disclosed GRIN LC device may be reduced by at least 20%. For example, when an optical sensor (e.g., a photo detector) is used to detect a distorted light (e.g., scattered light) caused by the fringing field effect, the detected light intensity of the distorted light (e.g., scattered light) of the disclosed GRIN LC device may be reduced by at least 20% as compared to that of the conventional GRIN LC device. As a result, the overall optical performance of the disclosed GRIN LC device may be significantly enhanced. It is noted that masking the gaps between patterned electrodes may also be referred to as masking the electrode boundaries (or edges) between electrodes.

Figure 1D:
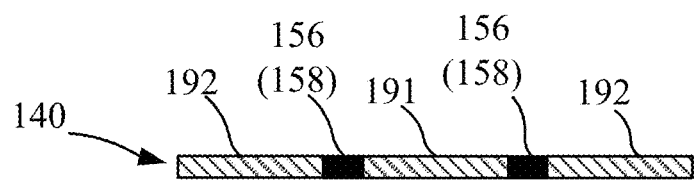
FIGS. 1D-1H illustrate various methods and structures for masking gaps between patterned electrodes in a GRIN LC device, according to various embodiments of the present disclosure.

Here, masking the electrode boundaries, or masking the gaps between the patterned electrodes, refers to at least one of filling the gaps with a light shielding material, or covering the gaps with the light shielding material. Masking the gaps may also be achieved through any other suitable ways to at least partially block a light incident onto the gaps from transmitting through the gaps, thereby reducing the light distortion in an output light of the GRIN LC devices. Various methods and structures for masking the gaps are illustrated in FIGS. 1D-1H. In FIGS. 1D-1H, an electrode layer 140 may include a plurality of discrete, patterned electrodes. The electrode layer 140 may be referred to as a patterned electrode layer. Two patterned electrodes 191, 192 are shown for illustrative purposes. In some embodiments, the patterned electrodes 191 and 192 may include stripe-shaped electrodes, zig-zag electrodes, interdigitated electrodes, or annular (ring-shaped) electrodes (which may include a circular electrode at the center), etc. For discussion purposes, a first electrode 191 may have a circular shape, and may be located at a center of the electrode layer 140. The first electrode 191 may also be referred to as a central electrode 191. A second electrode 192 may surround the first electrode 191, and may have an annular (or ring) shape. That is, the second electrode 192 may be a ring-shaped stripe, and may be concentric with the first electrode 191. A gap 156 may separate the two electrodes 191 and 192. When more annular electrodes are disposed concentric with the first electrode 191 and the second electrode 192, more gaps 156 exist between the neighboring electrodes. To reduce or suppress the optical artifacts (e.g., light scattering) caused by the fringing field effect at edges of the patterned electrodes, the gaps 156 may be masked (or the boundaries between the electrodes may be masked) using a light shielding material 158, such that the distorted light (e.g., scattered light) output from the GRIN LC device may be significantly reduced through any suitable mechanism, e.g., absorption, reflection, etc. In some embodiments, as shown in FIG. 1D, the gaps 156 may be filled by the light shielding material 158.

Figure 1E:
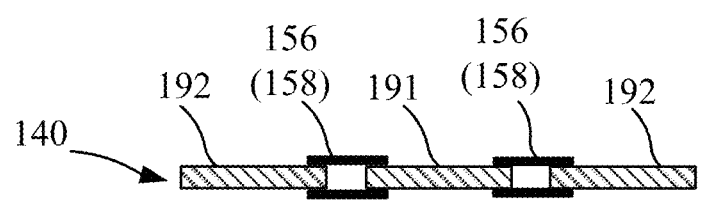

In some embodiments, as shown in FIG. 1E, the gap 156 may be covered by the light shielding material 158. FIG. 1E shows that both sides (e.g., upper and lower sides) of the gap 156 may be covered by the light shielding material 158. For example, the light shielding material 158 may be a ring applied to both of the upper surface and lower surface of the electrodes to cover the gap 156. The light shielding material stripe may have a width that is greater than the width of the gap 156, and may cover the gap 156 and a small portion of the surface areas on both sides (upper and lower) of the neighboring electrodes adjacent the gap 156. As shown in FIG. 1E, the gap 156 may not be filled with the light shielding material 158.

Figure 1F:
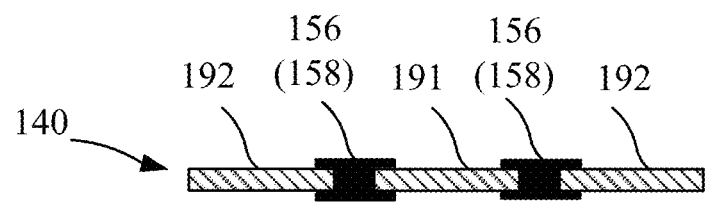

In some embodiments, the gap 156 may be filled with the light shielding material 158, and covered by the light shielding material 158 on both sides (e.g., upper and lower sides) of the gap 156, as shown in FIG. 1F. The embodiment shown in FIG. 1F is a combination of the embodiments shown in FIG. 1D and FIG. 1E.

Figure 1G:
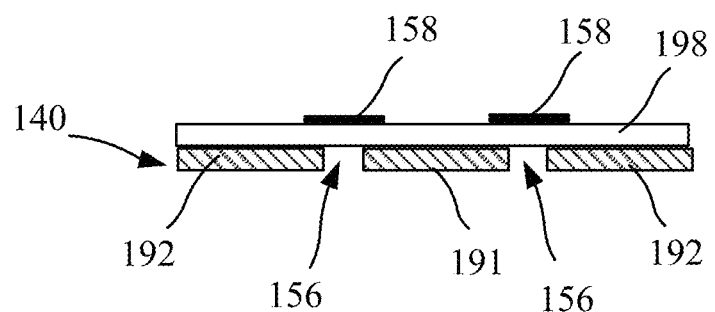
Figure 1H:
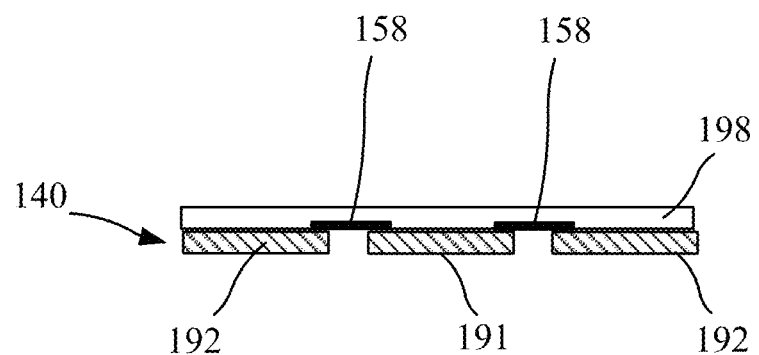

In some embodiments, the light shielding material 158 may be placed at a surface of a substrate, as shown in FIG. 1G and FIG. 1H. As shown in FIG. 1G, the GRIN LC device may include a substrate 198. The electrode layer 140 having the plurality of patterned electrodes 191, 192 separated with gaps 156 may be disposed at the substrate 198. In the embodiment shown in FIG. 1G, the light shielding material 158 may be disposed on a surface of the substrate 198 that is opposite to the other surface of the substrate 198 where the electrode layer 140 is disposed. The light shielding material 158 may be disposed at locations corresponding to the gaps 156. The width of the light shielding material 158 may be equal to or greater than the width of the gaps 156.

In the embodiment shown in FIG. 1H, the light shielding material 158 may be disposed on the same surface of the substrate where the electrode layer 140 is disposed. The light shielding material 158 may be disposed between the surface of the substrate 198 and the electrode layer 140 at locations corresponding to the gaps 156. The width of the light shielding material 158 may be greater than the width of the gaps 156. In some embodiments, the light shielding material 158 may be embedded or attached to the surface of the substrate 198. In such embodiments, the light shielding material 158 may have a width that is either equal to the width of the gaps 156, or greater than the width of the gaps 156.

For illustrative purposes, in the embodiments shown in the subsequent figures, the gaps are shown as being filled by the light shielding material 158. This manner of masking the gaps between neighboring patterned electrodes is only for illustrative purposes. The light shielding material 158 may block an input light from being transmitted through the gap 156 based on any suitable mechanism, such as absorption, reflection, etc. Any suitable material may be used as the light shielding material 158. For example, the light shielding material 158 may include a photosensitive acrylic resin with color pigments. In some embodiments, the light shielding material 158 may include, or be referred to as, a black matrix. The term "black matrix" is merely a technical term referring to a material that function to block transmission of a light through a suitable mechanism, such as absorption, reflection, etc. The material need not necessarily be black in color, and the material need not necessarily be in a matrix form. In some embodiments, the light shielding material 158 may be electrically non-insulating or electrically insulating.

Figure 2A:
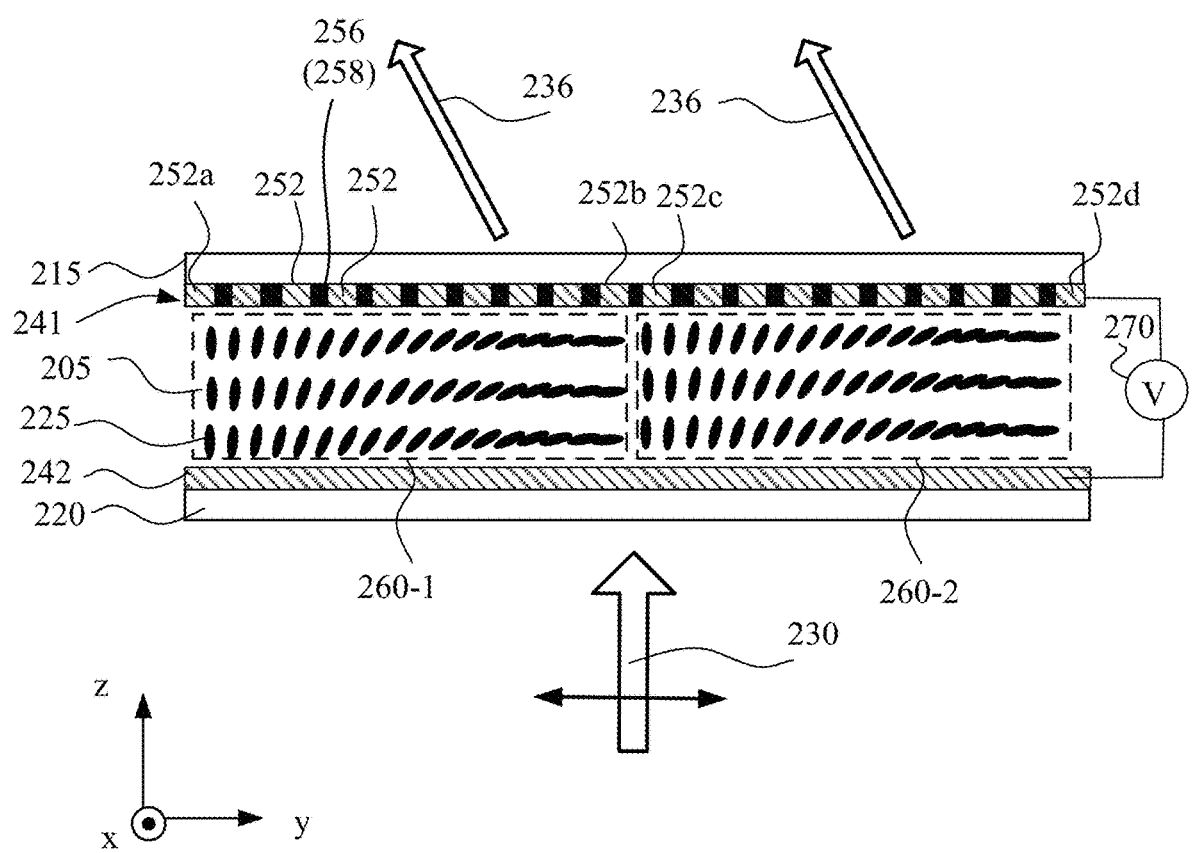
FIG. 2A schematically illustrates a diagram of an LC device, according to an embodiment of the present disclosure.

FIG. 2A schematically illustrates a y-z sectional view of an LC device 200, according to an embodiment of the present disclosure. The LC device 200 may be a gradient-index ("GRIN") liquid crystal ("LC") device. As shown in FIG. 2A, the LC device 200 may include two substrates, e.g., a first substrate 215 and a second substrate 220. The LC device 200 may include an LC layer 205 disposed between the substrates 215 and 220. The LC layer 205 may include LC molecules 225. In some embodiments, two electrode layers may be disposed at opposing inner surfaces of the substrates 215 and 220. The two electrode layers may be disposed at two opposite sides external to the LC layer 205. The two electrode layers include a first electrode layer 241 and a second electrode layer 242, as shown in FIG. 2A.

In some embodiments, the substrates 215 and 220 may be transparent and/or reflective in one or more predetermined spectra (or wavelength bands). In some embodiments, the substrates 215 and 220 may be transparent and/or reflective in at least a portion of the visible spectrum (e.g., about 380 nm to about 700 nm). In some embodiments, the substrates 215 and 220 may be transparent and/or reflective in at least a portion of the infrared ("IR") spectrum (e.g., about 700 nm to about 2 mm). In some embodiments, the substrates 215 and 220 may be transparent and/or reflective in at least a portion of the visible spectrum and at least a portion of the IR spectrum. In some embodiments, the substrates 215 and 220 may be fabricated based on an organic material and/or an inorganic material that is substantially transparent to the light of above-listed spectra, e.g., glass, polycarbonate ("PC"), polymethylmethacrylate ("PMMA"), or a combination thereof. The substrates 215 and 220 may be rigid or flexible. The substrates 215 and 220 may have flat surfaces or at least one curved surface. The LC layer 205 disposed at (e.g., formed at, attached to, deposited at, bonded to, etc.) the curved surface of the substrates 215 and 220 may also have a curved shape. In some embodiments, at least one of the substrates 215 and 220 may be a part of another device, another optical device, or another opto-electrical device. For example, the substrate 215 or 220 may be a conventional lens, e.g., a glass lens. In some embodiments, the substrate 215 or 220 may be a part of a functional device, such as a display screen. In some embodiments, the substrate 215 or 220 may be a part of an optical waveguide fabricated based on a suitable material, such as glass, plastics, sapphire, or a combination thereof.

In some embodiments, an alignment layer (not shown in FIG. 2A) may be provided at each of the substrates 215 and 220. In some embodiments, a single alignment layer may be provided at one of the substrate 215 and 220. The alignment layer may be configured to provide an alignment to the LC molecules 225 included in the LC layer 205. The alignment layer may be disposed at the opposing inner surface of the substrate 215 or 220. The alignment layer may be any suitable alignment layer, such as a photo-alignment material layer, a mechanically rubbed alignment layer, or an alignment layer with anisotropic nanoimprint, etc.

In some embodiments, each substrate 215 or 220 may be disposed with an electrode layer. The electrode layer may be disposed between the substrate 215 (or 220) and the corresponding alignment layer. For example, as shown in FIG. 2A, a first electrode layer 241 may be disposed at the first substrate 215 and a second electrode layer 242 may be disposed at the second substrate 220. In some embodiments, the electrode layer 241 or 242 may be substantially transmissive in the same spectrum as the substrate 215 or 220. For example, the electrode layer 241 or 242 may be an indium tin oxide ("ITO") electrode layer. In some embodiments, the electrode layer 241 or 242 may be substantially reflective in the same spectrum as the substrate 215. For example, the electrode layer 241 or 242 may be an aluminum electrode layer. In some embodiments, a voltage may be applied to the first electrode layer 241 and/or the second electrode layer 242 to generate an electric field in the LC layer 205. The electric field may re-orient the LC molecules 225, thereby configuring and/or switching an optical function provided by the LC device 200.

At least one of the electrode layer 241 or the electrode layer 242 may be a patterned electrode layer. In some embodiments, both of the first electrode layer 241 and the second electrode layer 242 may be patterned electrode layers. In some embodiments, one of the first electrode layer 241 and the second electrode layer 242 may be a patterned electrode layer, and the other one may be a continuous planar electrode layer.

For illustrative purposes, FIG. 2A shows the first electrode layer 241 as a patterned electrode layer, and the second electrode layer 242 as a continuous planar electrode layer. The first electrode layer 241 may include a plurality of electrodes 252 spaced apart from one another with gaps 256. In some embodiments, the electrodes 252 included in the patterned electrode layer 241 may include stripe-shaped electrodes, zig-zag electrodes, interdigitated electrodes, annular (ring-shaped) electrodes (which may include a circular electrode at the center), and/or pixelated electrodes, etc. The widths of the gaps 256 may be substantially small as compared to the thickness of the LC layer 205. In some embodiments, the patterned electrodes 252 may be substantially transmissive to a light incident onto the first electrode layer 241.

In some embodiments, the surface areas (e.g., top surface areas) of the electrodes 252 may be substantially the same. In some embodiments, the surface areas (e.g., top surface areas) of at least two of the electrodes 252 may be different. In some embodiments, each gap 256 between two neighboring electrodes 252 may be masked by a light shielding material 258 (e.g., covered by and/or filled with the light shielding material 258) to form a dark region corresponding to the gap 256. The dark region refers to a region through which a light is blocked from transmitting therethrough. Thus, a light from the substrate 215 side or from the LC layer 205 side may not transmit through the gap 256. In the embodiment shown in FIG. 2A, the dark regions corresponding to the gaps 256 filled with the light shielding material 258. When masking is provided through the configurations shown in FIGS. 1E-1H, the dark regions correspond to the region (including the gap) covered and/or filled by the light shielding material 158.

The light shielding material 258 may be similar to the light shielding material 158. For example, the light shielding material 258 may significantly attenuate or block an input light (e.g., a light incident onto the light shielding material 258) from transmitting therethrough via a suitable mechanism, e.g., absorption, reflection, etc. In some embodiments, the light shielding material 258 may include, or be referred to as, a black matrix. In some embodiments, the light shielding material 258 may be configured to significantly absorb a light incident onto the light shielding material 258, such that the light is substantially blocked from transmitting through the light shielding material 258. In some embodiments, the light shielding material 258 may be configured to significantly reflect a light incident onto the light shielding material 258, such that the light is substantially blocked from transmitting through the light shielding material 258. For the incident light within a predetermined wavelength range (e.g., visible light), light transmittance of the light shielding material 258 may be lower than or equal to a predetermined value (e.g., 10%, 5%, 1%, 0.5%, 0.01%, etc.). The light shielding material 258 may include any suitable materials that may attenuate or block the incident light within a predetermined wavelength range and/or having a predetermined polarization. In some embodiments, the light shielding material 258 may be made of an organic material and/or an inorganic material, such as a resin, a metal, and/or a polymer doped with dyes (e.g., a black dye) via printing, depositing, or photolithography, etc.

The LC device 200 may be a GRIN LC device, which may provide an optical effect based on a gradient distribution of the refractive index of LCs included in the LC layer 205. In some embodiments, the gradient distribution of the refractive index of LCs included in the LC layer 205 may be generated based on a spatially non-uniform electric field applied to the LCs through the electrode layers, multiple alignment regions of LCs, and/or holographic recordings in a polymer-network LC composite, etc.

In some embodiments, the spatially non-uniform electric field applied to the LCs through the first and second electrode layers 241 and 242 may re-orient the LC molecules 225 in the LC layer 205. For example, a vertical electric field may be applied to the LC layer 205 through the first and second electrode layers 241 and 242. The re-oriented LC molecules 225 may exhibit a predetermined phase profile, such that the GRIN LC device 200 may provide a predetermined optical effect. For example, as shown in FIG. 2A, the GRIN LC device 200 may be an LC-based optical phased array ("OPA"). The LC-based OPA may be configured for various applications, such as beam steering applications. For example, the LCs included in the LC layer 205 may have positive dielectric anisotropy, and may be homogeneously aligned in a y-axis direction at a voltage-off state by the one or more alignment layers. A diffractive phase profile in the LC layer 205 may be formed when a suitable driving voltage is applied across the LC layer 205 via the first and second electrode layers 241 and 242. For example, the second electrode layer 242 may be applied with a uniform driving voltage, or the second electrode layer 242 may be grounded. In some embodiments, voltages supplied to the electrodes 252 in the first electrode layer 241 may be different.

The GRIN LC device 200 may include a plurality of $2\pi$ phase resets. For illustrative purposes, two $2\pi$ phase resets, i.e., a first $2\pi$ phase reset 260-1 and a second $2\pi$ phase reset 260-2, are shown in FIG. 2A. Within a lateral range corresponding to each $2\pi$ phase reset 260-1 or 260-2, the amplitudes of the driving voltages applied to the electrodes 252 of the first electrode layer 241 may progressively change (e.g., decrease) from a leftmost sub-electrode (e.g., 252a in the $2\pi$ phase reset 260-1 or 252c in the $2\pi$ phase reset 260-2) to a rightmost sub-electrode (e.g., 252b in the $2\pi$ phase reset 260-1 or 252d in the $2\pi$ phase reset 260-2). Thus, from a leftmost edge to a rightmost edge of the $2\pi$ phase reset 260-1 or 260-2, the magnitude of the electric field generated in the $2\pi$ phase reset 260-1 or 260-2 may gradually change (e.g., decrease). Accordingly, from a leftmost edge to a rightmost edge of the $2\pi$ phase reset 260-1 or 260-2, the orientations of the directors of the LC molecules 225 may change from being substantially perpendicular to the surface of the first substrate 215 (or the second substrate 220) to being substantially parallel to the surface of the first substrate 215 (or the second substrate 220). As a result, the GRIN LC device 200 may operate in a diffraction state to diffract a linearly polarized input beam 230 polarized in the alignment direction (e.g., the y-axis direction) as a beam 236.

Although not shown, in some embodiments, when the amplitudes of driving voltages applied to the electrodes 252 of the first electrode layer 241 are substantially uniform from the leftmost electrode 252a (or 252c) to the rightmost electrode 252b (or 252d) of the $2\pi$ phase reset 260-1 or 260-2, the orientations of the directors of the LC molecules 225 may be substantially the same. That is, the orientations of the directions of the LC molecules 225 may be uniform. Thus, the LC layer 205 may have a substantially uniform refractive index distribution throughout the LC layer 205, and the LC device 200 may function as a substantially optically uniform plate for the input beam 230. That is, the LC device 200 may operate in a non-diffraction state for the beam 230 polarized in the alignment direction (e.g., the y-axis direction), and may transmit the beam 230 therethrough with substantially zero or negligible diffraction.

Figure 2B:
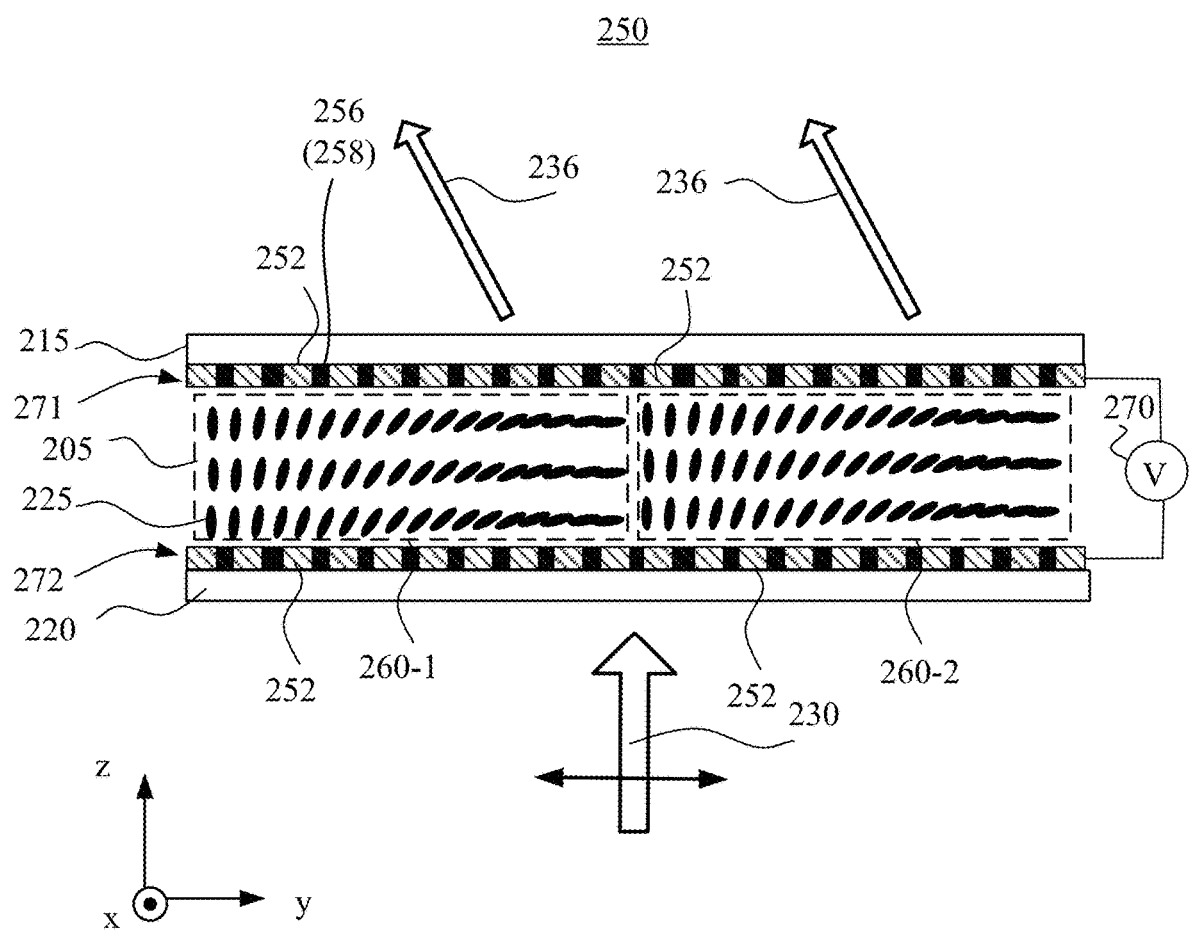
FIG. 2B schematically illustrates a diagram of an LC device, according to an embodiment of the present disclosure.

FIG. 2B schematically illustrates an LC device 250 according to an embodiment of the present disclosure. The LC device 250 may include elements, structures, and functions similar to or the same as those included in FIG. 2A. Different from the LC device 200 shown in FIG. 2A, the LC device 250 shown in FIG. 2B includes two patterned electrode layers, a first patterned electrode layer 271 and a second patterned electrode layer 272. Each of the patterned electrode layers 271 and 272 may be similar to or the same as the patterned electrode layer 241 shown in FIG. 2A. For example, each of the patterned electrode layers 271 and 272 may include a plurality of electrodes 252 separated by gaps 256, which may be masked by the light shielding material 258. In some embodiments, the electrodes 252 of the first electrode layer 271 may be substantially aligned with the electrodes 252 of the second electrode layer 272.

Figure 2C:
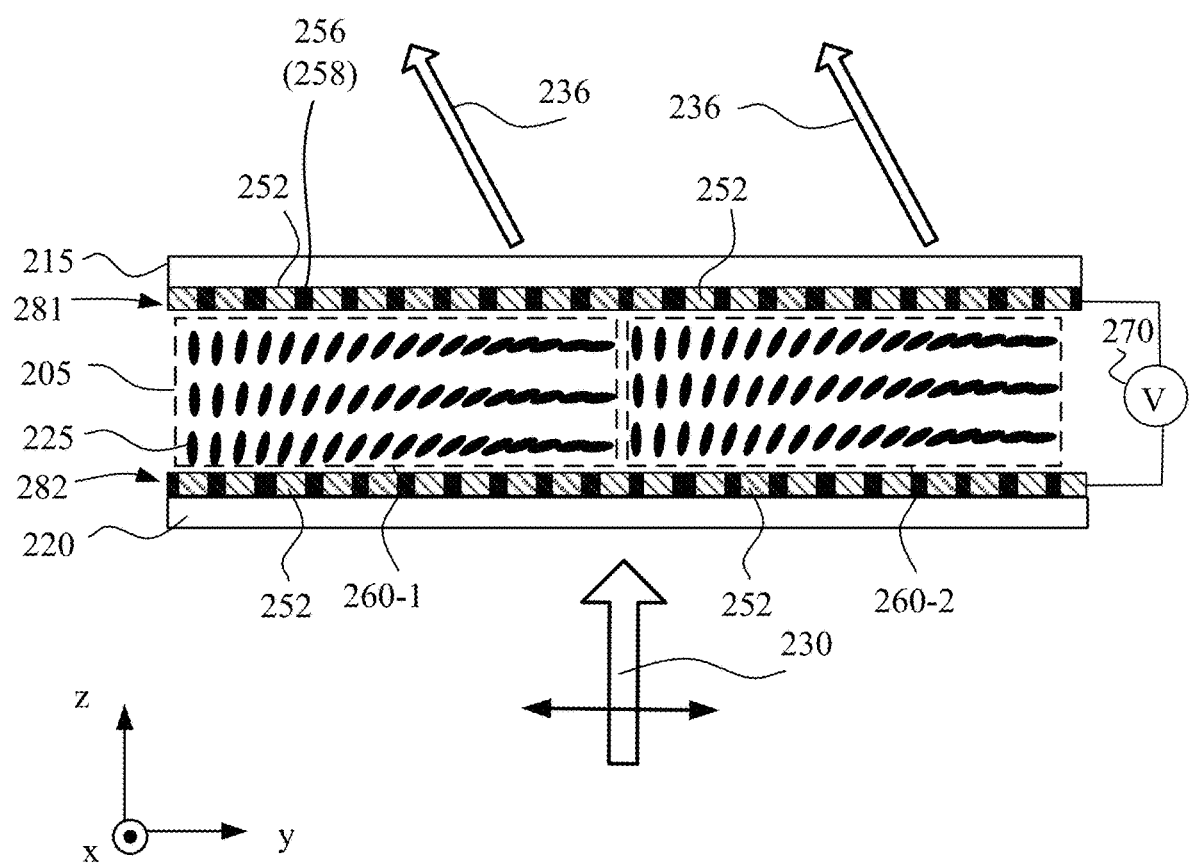
FIG. 2C schematically illustrates a diagram of an LC device, according to an embodiment of the present disclosure.

FIG. 2C schematically illustrates an LC device 280 according to an embodiment of the present disclosure. As shown in FIG. 2C, the LC device 280 may include elements, structures, and functions similar to or the same as those included in the LC device 200 or 250. Similar to the LC device 250, the LC device 280 includes two patterned electrode layers, a first patterned electrode layer 281 and a second patterned electrode layer 282. Each of the patterned electrode layers 281 and 282 includes a plurality of electrodes 252 separated by gaps 256 masked by the light shielding material 258. Different from the patterned electrode layers 271 and 272, in which the electrodes in both layers are aligned with one another, the electrodes 252 of the first electrode layer 281 may be partially offset from the electrodes 252 of the second electrode layer 282.

Referring to FIGS. 2A-2C, the LC layer 205 may include any suitable LC materials, such as nematic LCs. The LC layer 205 may be configured with a spatially non-uniform refractive index (e.g., a gradient refractive index) distribution in a predetermined direction (e.g., a y-axis direction) perpendicular to a thickness direction (e.g., a z-axis direction) of the LC layer 205. For example, directors of LC molecules 255 may be configured with spatially non-uniform orientations in the predetermined direction. As a result, the LC layer 205 may exhibit a spatially non-uniform refractive index distribution in the predetermined direction. In some embodiments, the spatially non-uniform orientations of the directors of LC molecules 255 may be caused by an electric field generated in the LC layer 205 through the electrode layers disclosed herein, and/or may be caused by the alignments provided by the one or two alignment layers coupled with the LC layer 205.

Figure 2D:
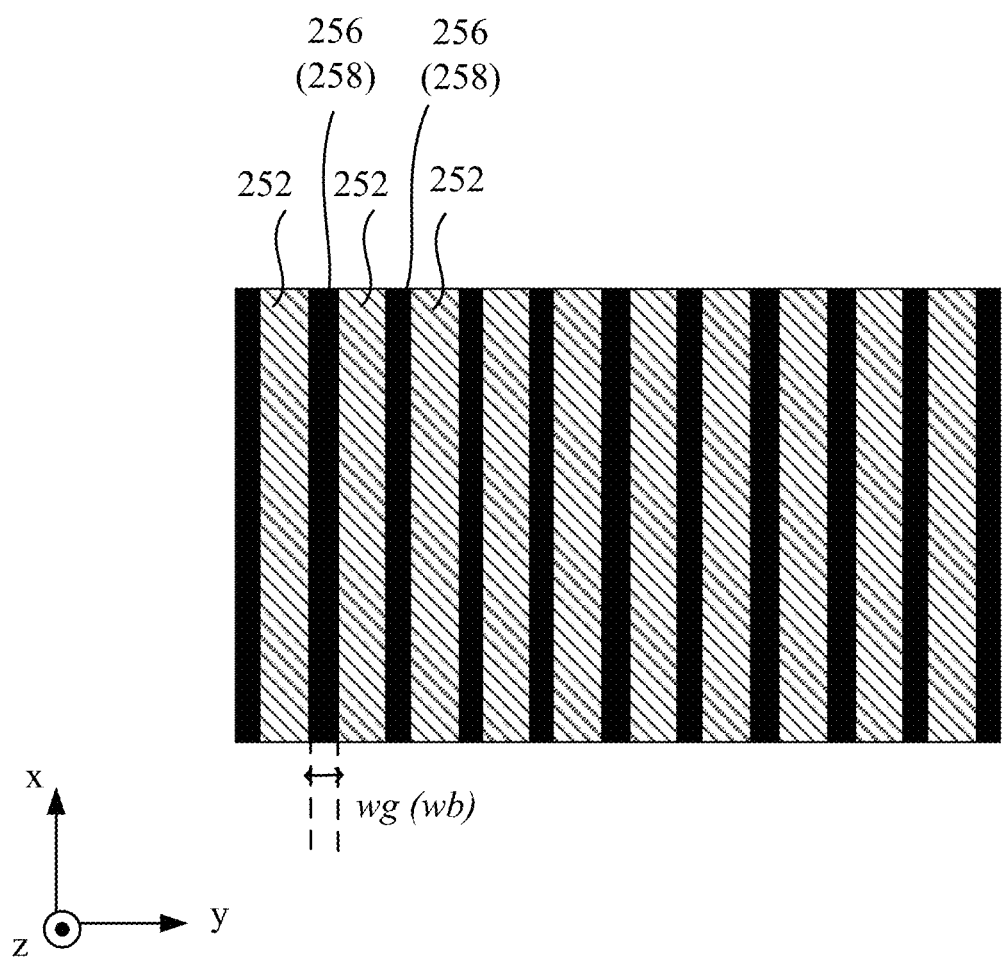
FIG. 2D schematically illustrates a diagram of a patterned electrode layer included in the LC device shown in FIG. 2A, FIG. 2B, or FIG. 2C, according to an embodiment of the present disclosure.

FIG. 2D schematically illustrates an xy-sectional view of a patterned electrode layer 290, which may be an embodiment of the patterned electrode layer 241, 271, 272, 281, or 282 included in the LC device 200, 250, or 280, according to an embodiment of the present disclosure. As shown in FIG. 2D, the patterned electrode layer 290 may include the plurality of electrodes 252 arranged in parallel. For illustrative purposes, the shape of the electrodes 252 is shown as a stripe shape, although other suitable shapes may be used. The stripe-shaped electrodes 252 may be extended in the x-axis direction and may be arranged in parallel along the y-axis direction. The stripe-shaped electrodes 252 may be spaced apart from one another with gaps 256 masked by the light shielding material 258.

Each gap 256 may have a width wg. The width wg of the gap 256 may be substantially small, such that the gap 256 and the light shielding material 258 may be substantially unperceivable by human eyes. In some embodiments, the width wg may be in a range of about 300 nanometer ("nm") to about 3 micrometer ("μm"). In some embodiments, the width wg may be in a range of about 400 nm to about 3 In some embodiments, the width wg may be in a range of about 500 nm to about 3 In some embodiments, the width wg may be in a range of about 800 nm to about 3 In some embodiments, the width wg may be in a range of about 1 μm to about 3 In some embodiments, the width wg may be in a range of about 1.5 μm to about 3 In some embodiments, the width wg may be in a range of about 2 μm to about 3 In some embodiments, the width wg may be in a range of about 2.5 μm to about 3 In some embodiments, the width wg may be in a range of about 300 nm to about 6 μm.

In the patterned electrode layer 290 shown in FIG. 2D, the gap 256 masked by the light shielding material 258 may form a dark region, which functions to block an input light from being transmitted therethrough via, e.g., absorption, reflection, etc. In some embodiments, a light transmittance of the dark region may be lower than or equal to a predetermined value, for an input light within a predetermined wavelength range (e.g., a visible light) and/or having a predetermined polarization. In some embodiments, the predetermined value may be 20%, 15%, 10%, 5%, 2%, 0.5%, 0.1%, or 0.05%.

In some embodiments, the light shielding material 258 may include a plurality of light shielding stripes (which may also be referred to as black matrix stripes) covering and/or filling the gaps 256 between neighboring electrodes 252. The light shielding material 258 may also be referred to as a black matrix. In some embodiments, the light shielding stripe may have a width wb. In some embodiments, the width wb of the light shielding stripe may be substantially the same as the width wg of the gap 256. The width wb of the light shielding stripe may also be referred to as a line width of the light shielding material (or the black matrix) 258. For example, the line width wb may be in a range of about 300 nm to about 3 μm. In some embodiments, the line width wb may be in a range of about 400 nm to about 3 μm. In some embodiments, the line width wb may be in a range of about 500 nm to about 3 μm. In some embodiments, the line width wb may be in a range of about 800 nm to about 3 μm. In some embodiments, the line width wb may be in a range of about 1 μm to about 3 μm. In some embodiments, the line width wb may be in a range of about 1.5 μm to about 3 μm. In some embodiments, the line width wb may be in a range of about 2 μm to about 3 μm. In some embodiments, the line width wb may be in a range of about 2.5 μm to about 3 μm. In some embodiments, the line width wb may be in a range of about 300 nm to about 6 μm. In some embodiments, the width wb of the light shielding material 258 may be slightly smaller than the width wg of the gap.

By masking the gaps 256 through the light shielding material 258, an input light may be substantially blocked from being transmitted through the gaps 256. Thus, the distorted light resulting from the fringing field effect at edges of the patterned electrodes 252 may be significantly reduced at an output side of the GRIN LC device 200 (or 250, 280). Thus, the optical artifacts (e.g., the light scattering) resulting from the fringing field effect may be significantly reduced as compared to conventional GRIN LC devices in which the gaps are unmasked. Accordingly, the optical performance of the disclosed GRIN LC device 200 (or 250, 280) may be improved.

In some embodiments, the LC device disclosed herein may be a Fresnel LC lens, such as a refractive Fresnel lens, a diffractive Fresnel lens, or a refractive-diffractive-type Fresnel lens, etc. A Fresnel LC lens may provide a large aperture size without compromising the response time. A Fresnel LC lens may include any suitable type of Fresnel structure, such as a Fresnel zone plate lens including areas having a phase difference of a half wave to adjacent areas, a diffractive Fresnel lens having a segmented parabolic phase profile where the segments are small and cause significant diffraction, or a refractive Fresnel lens having a segmented parabolic profile where the segments are sufficiently large such that diffraction effects are minimized. Other structures may also be used for the Fresnel LC lens.

Figure 3A:
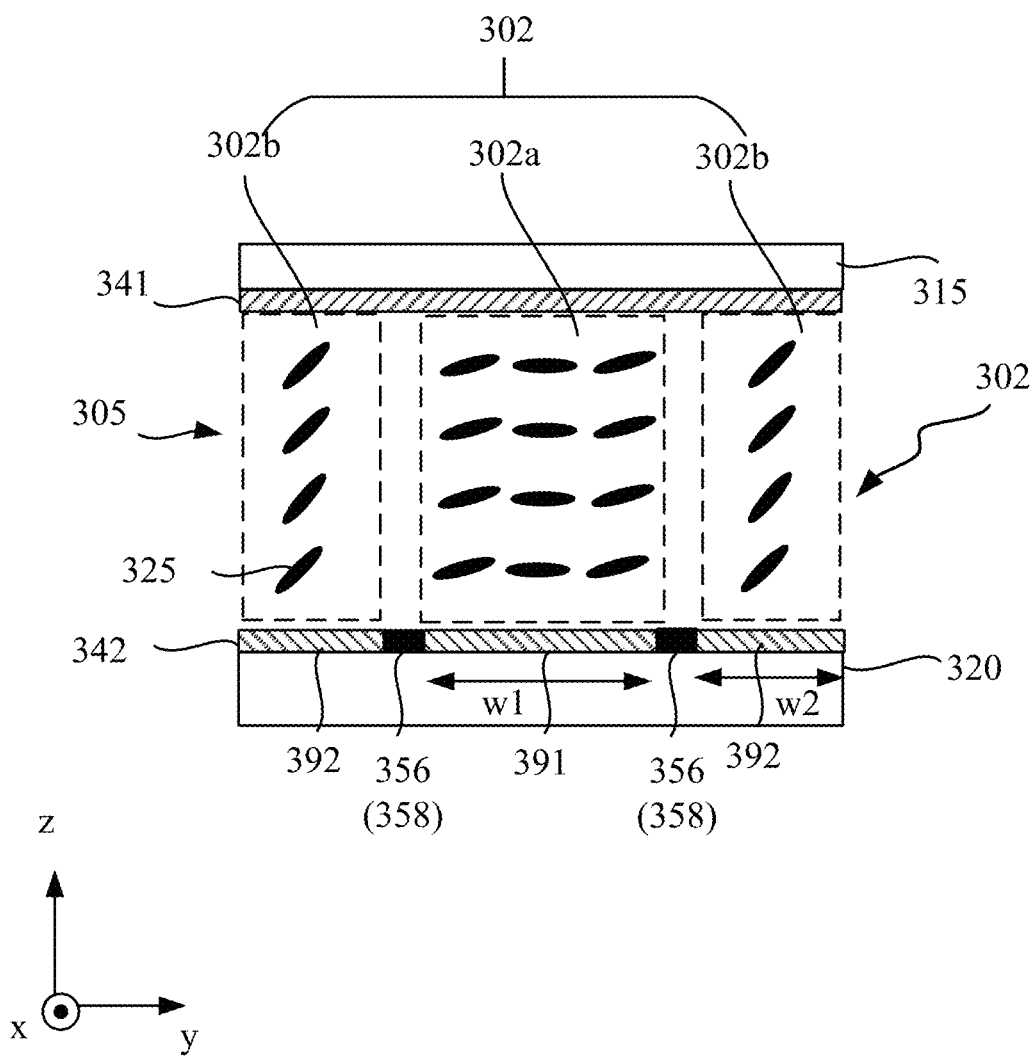
FIG. 3A schematically illustrates a diagram of an LC device, according to an embodiment of the present disclosure.

FIG. 3A schematically illustrates a y-z sectional view of an LC device 300, according to another embodiment of the present disclosure. The LC device 300 may be a refractive Fresnel LC lens. In some embodiments, the refractive Fresnel lens may be a segmented phase profile ("SPP") LC lens. For discussion purposes, the LC device 300 is also referred to as an SPP LC lens 300. In some embodiments, the SPP LC lens 300 may be configured with a segmented parabolic phase profile or a plurality of phase segments (or resets) in a parabolic phase profile. The size of the phase segment (or reset) may be sufficiently large such that the diffraction angle is smaller than the angular resolution of human eyes. Thus, the diffraction effects may be unobservable by human eyes.

As shown in FIG. 3A, the SPP LC lens 300 may include an LC layer 305 disposed between two substrates, a first substrate 315 and a second substrate 320. The substrate 315 or 320 may be similar to or the same as the substrate 215 or 220 shown in FIGS. 2A-2C. The Fresnel structure of the SPP LC lens 300 is represented by a plurality of concentric zones 302 of increasing radii, which are referred as Fresnel segments or Fresnel resets. For discussion purposes, FIG. 3A shows the concentric zones 302 may include a central, cylindrical zone 302a and an annular, cylindrical (ring-shaped) zone 302b surrounding the central zone 302a. Although not shown in FIG. 3A, additional annular, cylindrical zones may be included outside of the zone 302b. In the configuration shown in FIG. 3A, the SPP LC lens 300 may include two Fresnel segments or Fresnel resets, e.g., a first Fresnel reset represented by the central zone 302a and a second Fresnel reset represented by the zone 302b. Additional Fresnel segments or Fresnel resets may be included in the SPP LC lens 300.

In some embodiments, each substrate 315 or 320 may be provided with a conductive electrode layer, e.g., a first electrode layer 341 or a second electrode layer 342. In some embodiments, each of the first electrode layer 341 and the second electrode layer 342 may be an ITO electrode layer. An alignment layer (not shown) may be disposed at an inner surface (a surface facing the LC layer 305) of at least one (e.g., each) of the electrode layers 341 and 342. In some embodiments, the alignment layers may be configured with homogeneous anti-parallel alignments, e.g., one alignment layer provides an alignment in the +y-axis direction and the other alignment layer provides an alignment in the −y-axis direction. The alignment layers may homogeneously align the LC molecules 325 at a voltage-off state (e.g., V=0, not shown in FIG. 3A). In some embodiments, one of the electrode layers 341 and 342 may be a continuous planar electrode layer, and the other one of the electrode layers 341 and 342 may be a patterned electrode layer. For discussion purposes, FIG. 3A shows the first electrode layer 341 may be a continuous planar electrode layer, and the second electrode layer 342 may be a patterned electrode layer.

The second electrode layer 342 may include a plurality of electrodes 391 and 392 corresponding to the plurality of Fresnel resets 302, respectively. The electrode 391 may be a central electrode, and may have a circular shape. The diameter (or width) of the electrode 391 may be w1. The electrode 392 may be an annular (or ring-shaped) electrode concentric with the central electrode 391. The central electrode 391 having a circular shape may be regarded as a special case of an annular electrode with an inner radius being zero. Although one annular electrode 392 is shown (note the two pieces 392 in the cross sectional view belong to the same annular electrode 392), the patterned electrode layer 342 may include two or more additional annular electrodes concentric with the central electrode 391 and the annular electrode 392, as shown in FIG. 3C described below. The additional annular electrodes may have widths of w3, w4, w5, etc. The electrodes 391 and 392 may be separated by a gap 356. When additional annular electrodes are included, additional gaps 356 may separate the additional annular electrodes. The gap 356 may be masked by a light shielding material 358, which may be similar to or the same as the light shielding material 158 or 258. Due to the circular shape of the electrode 391 and the ring shape of the electrode 392, the gap 356 may also have a ring shape. That is, the gap 356 is an annular gap.

A power source (not shown in FIG. 3A) may supply suitable voltages to the electrode layers 341 and 342 to generate a vertical electric field in the LC layer 305 to re-orient the LC molecules 325, thereby forming a lens having a predetermined phase profile. For example, the planar, first electrode layer 341 may be supplied with a uniform voltage (e.g., being connected to ground), and the patterned electrodes included in the second electrode layer 342 may be supplied with different voltages. The SPP LC lens 300 may be polarization sensitive (or selective). For example, the SPP LC lens 300 may selectively focus or defocus a light of a predetermined polarization, and may not focus or defocus of lights of other polarizations. In some embodiments, the SPP LC lens 300 may provide an adjustable optical power to a linearly polarized input beam that is polarized in the y-axis direction (e.g., a p-polarized input beam), and may function as a substantially optically uniform plate to a linearly polarized input beam polarized in an x-axis direction (e.g. an s-polarized input beam).

Figure 3B:
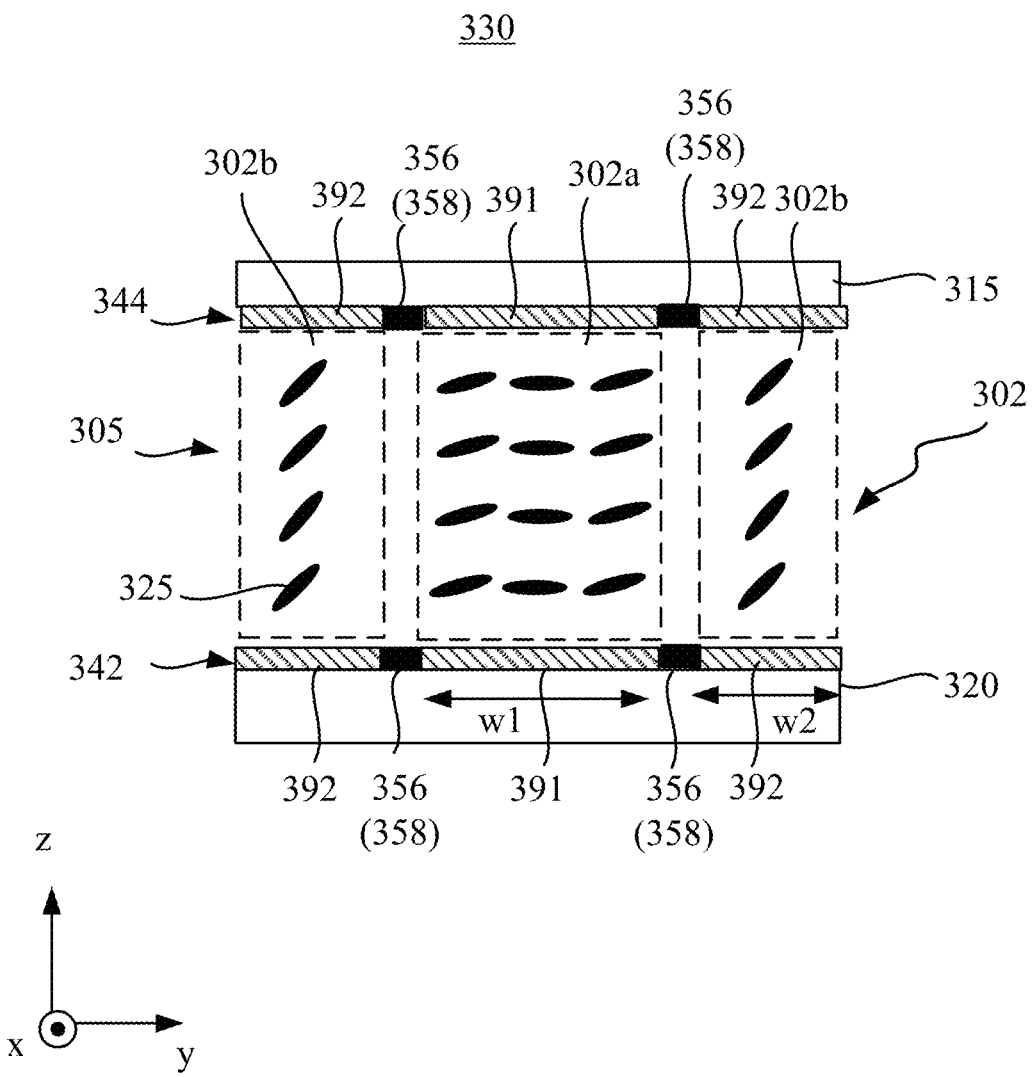
FIG. 3B schematically illustrates a diagram of an LC device, according to an embodiment of the present disclosure.
Figure 3C:
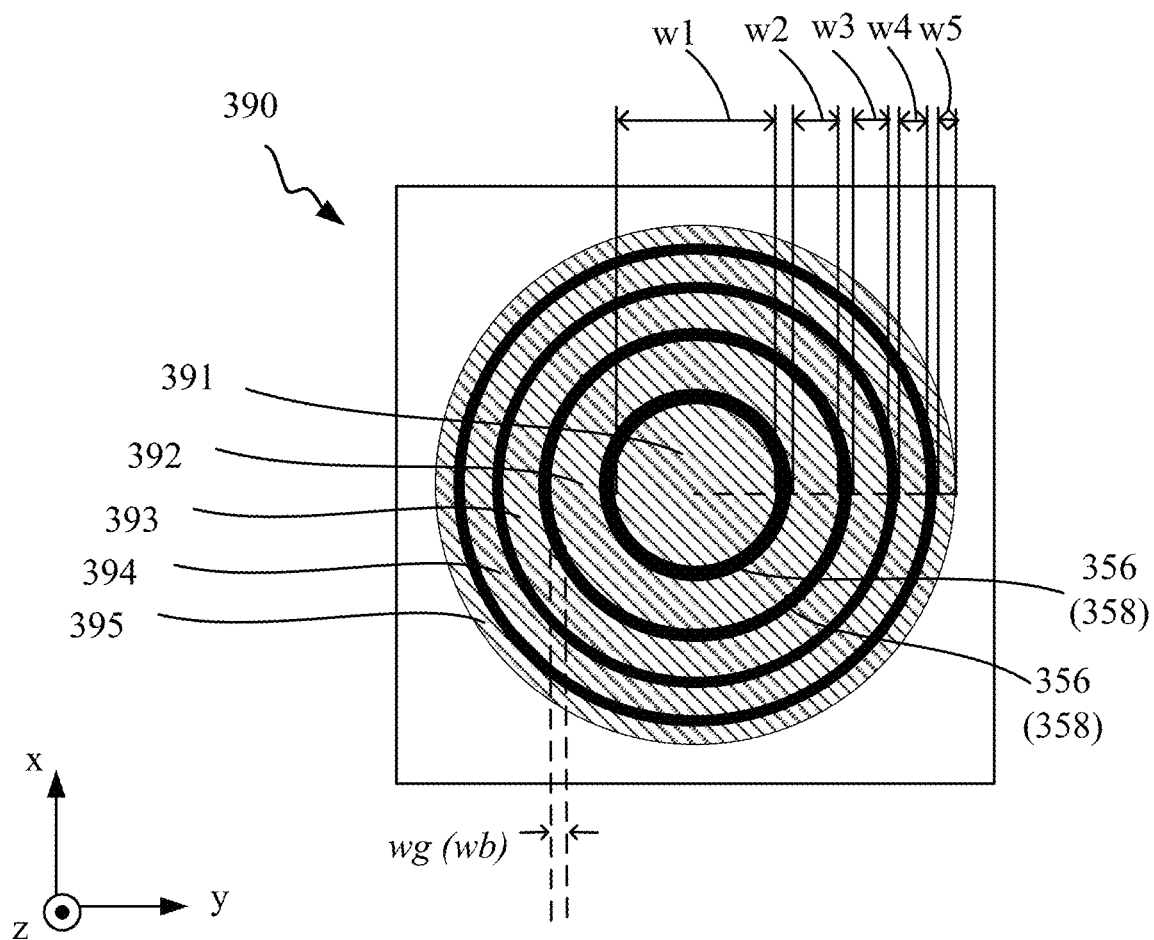
FIG. 3C schematically illustrates a diagram of a patterned electrode layer included in an LC device, according to an embodiment of the present disclosure.

FIG. 3B is a schematic y-z sectional view of an LC device 330, according to an embodiment of the present disclosure. The LC device 330 may include elements, structures, and functions similar to or the same as the LC device 300. For example, the LC device 330 may be a refractive Fresnel LC lens, such as a segmented phase profile ("SPP") LC lens. The LC device 330 differs from the LC device 300 in that a first electrode layer 344 (i.e., the upper electrode layer in FIG. 3B) is also a patterned electrode layer. The first electrode layer 344 may be similar to or the same as the second electrode layer 342. For example, in some embodiments, the first electrode layer 344 may have an identical structure and function as the second electrode layer 342. Voltages applied to the first electrode layer 344 and the second electrode layer 342 may be different to generate an electric field in the LC layer 305. For the convenience of illustration and discussion, the electrodes, gaps, and light shielding materials included in the first electrode layer 344 are labelled with the same reference numbers as those included in the second electrode layer 342. It is understood that the use of the same reference numbers is for convenience only, and do not necessarily indicate that the corresponding elements are the same. The corresponding elements may or may not have the same structure, same function, and/or same properties.

In some embodiments, the electrodes 391, 392, the gaps 356, and the light shielding material 358 included in the first and second electrode layers 344 and 342 may be aligned with one another. In some embodiments, the electrodes 391, 392, the gaps 356, and the light shielding material 358 included in the first and second electrode layers 344 and 342 may be slightly offset between the two electrode layers 344 and 342. In each of the electrode layers 344 and 342, the surface areas (e.g., the top surfaces) of the electrodes 391 and 392 may be substantially identical. As the radii (measured from the center of the central electrode 391) increases, the widths w1 and w2 of the electrodes 391 and 392 may gradually decrease from the central electrode 391 to the outermost annular electrode. For example, when there are four annular electrodes concentrically surrounding the central electrode 391, the widths of the electrodes may gradually decrease from the central electrode 391 to the outermost (e.g., the fourth) annular electrode, such that the surface area of the electrodes is substantially the same. In some embodiments, using concentric ring electrodes with equal surface areas, a step-wise phase profile of LC lens may be achieved, which may be relatively precisely tuned. In some embodiments, a greater number of steps (e.g., number of electrodes) per wave may provide a higher diffraction efficiency.

Although not shown in FIG. 3A and FIG. 3B, in some embodiments, the surface areas of the electrodes 391 and 392 may be different. For example, when there are three or more electrodes (e.g., the central electrode 391 plus two or more annular electrodes), surface areas of at least two of the electrodes may be different. In some embodiments, for each of the first electrode layer 344 and the second electrode layer 342, the surface areas of the electrodes 391 and 392 may gradually decrease from the central electrode 391 to the outermost electrode (e.g., 392 in the example shown in FIG. 3B, or any other annular electrode if there are more than one annular electrode). In some embodiments, the widths of the electrodes may be the same. As the radii of the electrodes increases from the central electrode to the outermost annular electrode, the surface area of the electrodes may also increase.

FIG. 3C schematically illustrates an x-y sectional view of a patterned electrode layer 390, according to an embodiment of the present disclosure. The patterned electrode layer 390 may be an embodiment of the patterned electrode layers 342 and 344 shown in FIG. 3A and FIG. 3B. As shown in FIG. 3C, the patterned electrode layer 390 may include a plurality of concentric electrodes. The plurality of concentric electrodes may include the central electrode 391 and a plurality of annular (or ring-shaped) electrodes 392-395 disposed surrounding the central electrode 391 in a concentric form. As shown in FIG. 3C, the central electrode 391 may have a circular shape (or a disk shape). In some embodiments, the central electrode 391 may have any other suitable shape. The electrodes 391-395 may be discrete and concentric ring-shaped stripes with a substantially same planar surface area (i.e., the top planar surface area of the ring-shaped stripes may be the same). For example, as the radii of the electrodes 391-395 measured from the center of the central electrode 391 gradually increase, the widths (e.g., w1, w2, w3, w4, w5) of the electrodes 391-395 (e.g., the widths of the top surfaces of the electrodes) may gradually decrease. With suitably configured different widths, the electrodes 391-395 may have the identical planar surface area. For discussion purposes, the electrodes 391-395 may correspond to five Fresnel resets in the SPP LC lens 300 or 330 (although not all five resets are shown in FIG. 3A or 3B), respectively. For example, referring to FIGS. 3A and 3B, the electrodes 391-395 shown in FIG. 3C may correspond to the first Fresnel reset represented by the cylindrical zone 302a, the second Fresnel reset represented by the annular zone 302b, a third Fresnel reset, a fourth Fresnel reset, and a fifth Fresnel reset, which are not shown in FIG. 3A or FIG. 3B. With the disclosed electrodes configuration, when the phase difference between neighboring electrodes is the same, a parabolic phase profile may be obtained. If the phase is proportional to the applied voltage, a linear change in the voltage across the electrodes (same difference in voltage between any two electrodes) may yield a desired parabolic phase profile.

Also as shown in FIG. 3C, the electrodes 391-395 may be spaced apart from one another with gaps 356. Due to the circular and annular shapes of the electrodes 391-395, the gaps 356 may have annular shapes and may be concentric with the electrodes. A width wg of the gap 356 may be substantially small such that the gap 356 may be substantially unperceivable by human eyes. In other words, the total area defined by the gaps 356 may be substantially unperceivable by human eyes. In some embodiments, the width wg may be in a range of about 300 nm to about 3 µm. In some embodiments, the width wg may be in a range of about 400 nm to about 3 µm. In some embodiments, the width wg may be in a range of about 500 nm to about 3 µm. In some embodiments, the width wg may be in a range of about 800 nm to about 3 µm. In some embodiments, the width wg may be in a range of about 1 µm to about 3 µm. In some embodiments, the width wg may be in a range of about 1.5 µm to about 3 µm. In some embodiments, the width wg may be in a range of about 2 µm to about 3 µm. In some embodiments, the width wg may be in a range of about 2.5 µm to about 3 µm. In some embodiments, the width wg may be in a range of about 300 nm to about 6 µm.

In some embodiments, the gaps 356 may be masked by (e.g., covered by and/or filled with) a light shielding material 358. The light shielding material 358 may be similar to or the same as the light shielding material 158 or 258. The gaps 356 masked by the light shielding material 358 may form dark regions, which blocks an input light from being transmitted therethrough via a suitable mechanism, e.g., absorption, reflection, etc. For example, for a light (e.g., a visible light) incident onto the patterned electrode layer 390, the electrodes 391-395 may be configured to substantially transmit the incident light, and the dark regions between the electrodes may be configured to substantially block the input light from being transmitted therethrough via any suitable mechanism, e.g., absorption, reflection, etc. In some embodiments, a light transmittance of the dark regions may be configured to be lower than or equal to a predetermined value for the input light having a wavelength within a predetermined wavelength range and/or a predetermined polarization. In some embodiments, the predetermined value may be 20%, 15%, 10%, 5%, 2%, 1%, 0.5%, 0.1%, or 0.05%. Due to the small width of the gaps 356, the dark regions may not be perceivable to human eyes.

In some embodiments, the light shielding material 358 may include or be referred to as a black matrix. In some embodiments, the light shielding material 358 may be configured to significantly absorb an incident light. A light transmittance of the light shielding material 358 may be lower than or equal to the predetermined value. The light shielding material 358 may include any suitable materials that may attenuate or block the incident light having a predetermined wavelength and/or a predetermined polarization. For example, the light shielding material 358 may be made of an organic material and/or an inorganic material, such as a resin, a metal, and/or a polymer doped with dyes via printing, depositing, or photolithography, etc. Other additional materials not specified in this disclosure may be used in combination with the light shielding material (158, 258, or 358) for bonding, insulating, etc.

In some embodiments, the light shielding material 358 may be substantially electrically insulating. In some embodiments, the light shielding material 358 may include a plurality of ring-shaped light shielding stripes (e.g., black matrix stripes) covering and/or filling the gaps 356 between neighboring electrodes 391-395. The light shielding material 358 may also be referred to as a black matrix. The ring-shaped black matrix stripes may be concentric with one another, and may have increasing radii from the central electrode 391 to the outermost electrode 395. In some embodiments, a width wb of the ring-shaped black matrix stripe may be substantially the same as the width wg of the gap 356. In some embodiments, the width wb of the ring-shaped black matrix stripe may be slightly smaller than the width wg of the gap 356. The width wb of the ring-shaped black matrix stripes may also be referred to as a line width of the light shielding material 358. For example, the line width wb of the light shielding material 358 may be in a range of about 300 nm to about 3 µm. In some embodiments, the line width wb may be in a range of about 400 nm to about 3 µm. In some embodiments, the line width wb may be in a range of about 500 nm to about 3 µm. In some embodiments, the line width wb may be in a range of about 800 nm to about 3 µm. In some embodiments, the line width wb may be in a range of about 1 µm to about 3 µm. In some embodiments, the line width wb may be in a range of about 1.5 µm to about 3 µm. In some embodiments, the line width wb may be in a range of about 2 µm to about 3 µm. In some embodiments, the line width wb may be in a range of about 2.5 µm to about 3 µm. In some embodiments, the line width wb may be in a range of about 300 nm to about 6 µm.

Figure 3D:
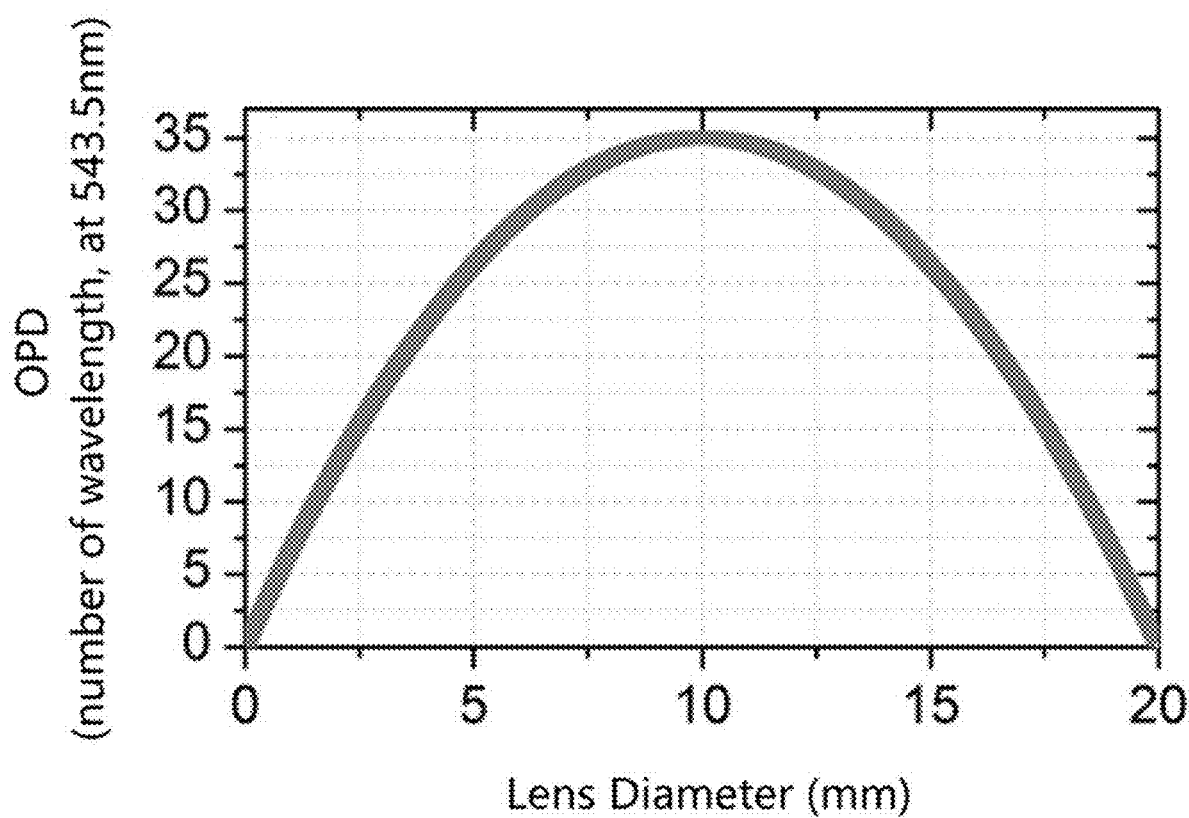
FIG. 3D schematically illustrates a phase profile of an LC lens without phase resets.
Figure 3E:
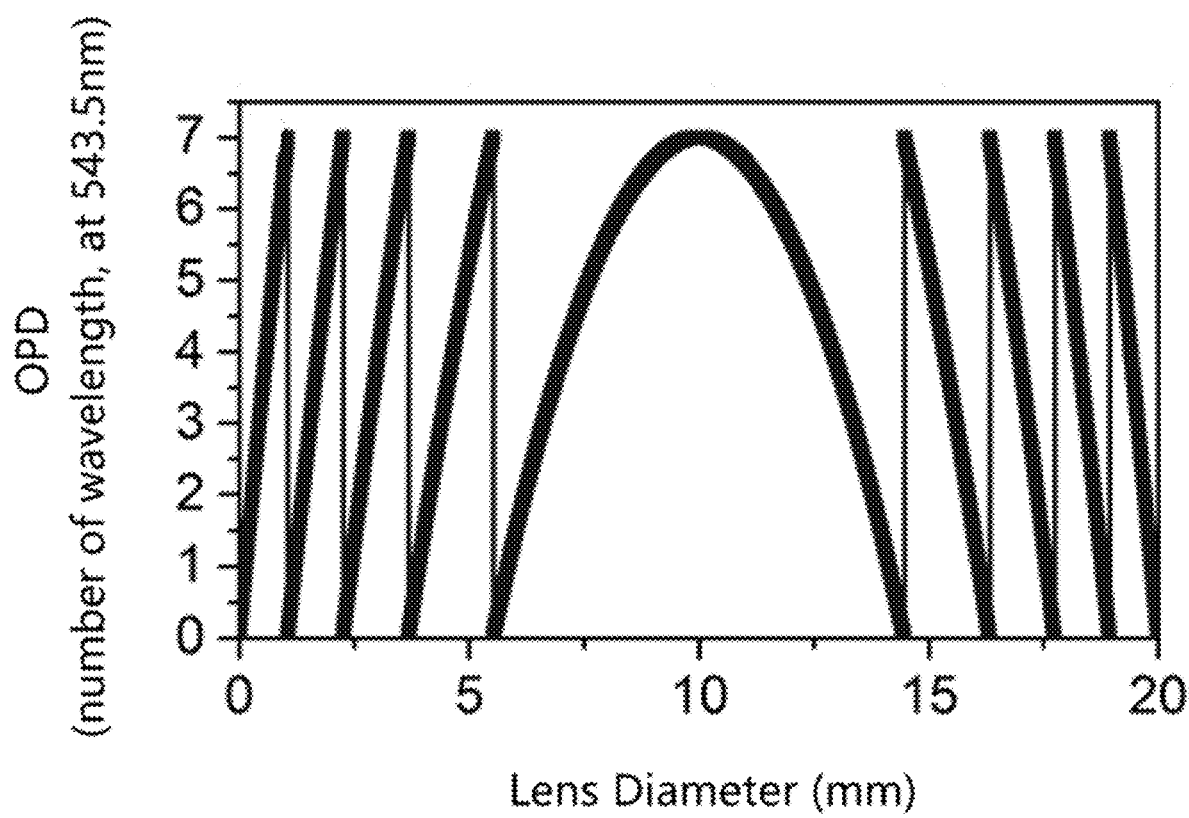
FIG. 3E schematically illustrates a phase profile of an LC device, according to an embodiment of the disclosure.

FIG. 3D illustrates a phase profile for a ±0.375 Diopter LC lens that does not include any phase resets, where the optical path difference ("OPD") equals to 35λ. The aperture of the LC lens is 20 mm, and the thickness of the LC lens is about 70 µm for LC materials with a birefringence Δn of 0.27. To decrease the effective thickness of the LC lens, phase resets or segments may be introduced into the lens phase profile. FIG. 3E illustrates a 2D phase profile of the SPP LC lens 300 shown in FIG. 3A or the SPP LC lens 330 shown in FIG. 3B when the SPP LC lens 300 or 330 includes 5 phase resets. The phase jump or discontinuity at the phase zone boundary is about 2π for the design wavelength. The thickness of the SPP LC lens 300 or 330 is reduced by about 5 times and, accordingly, the response time is improved by a factor of 25. That is, through introducing the phase resets in the parabolic phase profile, the optical power of the SPP LC lens 300 or 330 may be adjusted sufficiently fast. The SPP LC lens 300 or 330 may provide a large aperture size without compromising the response time.

Referring to FIG. 3C and FIG. 3E, the number of the phase resets in the parabolic phase profile may be determined based on specific configurations of the Fresnel structure and properties of the SPP LC lens 300 or 330 to be achieved, such as a predetermined optical power, a predetermined lens aperture, a predetermined switching time, and/or a predetermined image quality of the LC lens. A large number of phase steps within one wavelength of OPD (i.e., per wavelength) may be desirable for an accurate representation of the phase profile. Meanwhile, to configure the SPP LC lens 300 or 330 with a negligible diffraction for near eye applications, the minimum width of the Fresnel segments (i.e., the minimum Fresnel segment width) of the SPP LC lens 300 or 330 may be larger than about 1 mm for a green light having a wavelength of 543.5 nm.

Referring to FIGS. 3A-3C and 3E, through masking the gaps 356 between the neighboring discrete electrodes 391-395 with the light shielding material 358, Fresnel boundary artifacts (e.g., light scattering) caused by the fringing field effect may be significantly reduced. For example, high angle scattering happening at the boundaries of the Fresnel reset may be significantly reduced (e.g., absorbed) by the light shielding material 358. Accordingly, the image performance of the SPP LC lens 300 or 330 may be significantly improved.

Figure 3F:
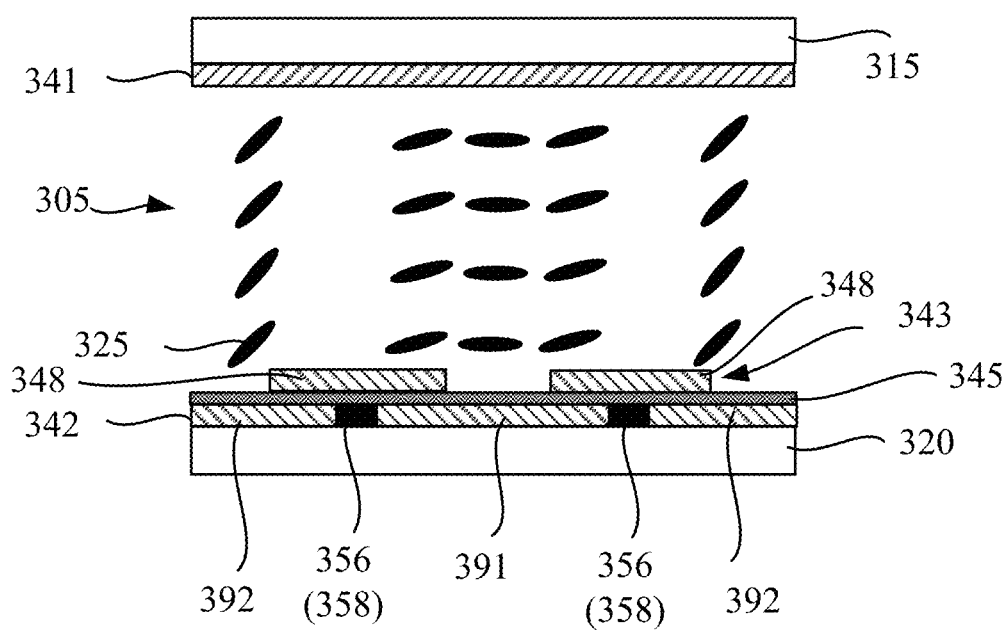
FIG. 3F schematically illustrates a diagram of an LC device, according to an embodiment of the present disclosure.

FIG. 3F schematically illustrates a y-z sectional view of an LC device 350, according to an embodiment of the present disclosure. The LC device 350 may be an SPP LC lens. Thus, the LC device 350 may be referred to as an SPP lens 350 for discussion purposes. The SPP lens 350 may include elements similar to or the same as those included in the SPP LC lens 300 or 330. Descriptions of the same or similar elements can refer to the above descriptions rendered in connection with FIGS. 3A-3C and FIG. 3E. In the embodiment shown in FIG. 3F, in addition to the first electrode layer 341 and the second electrode layer 342, the SPP LC lens 350 may also include a floating electrode layer 343 configured to further reduce the Fresnel boundary artifacts caused by the fringing field effect. The floating electrode layer 343 may be disposed at the second substrate 320 between the patterned electrode layer 342 and the LC layer 305. For example, the floating electrode layer 343 may be disposed between the LC layer 305 and the patterned electrode layer 342. An insulating layer 345 may be disposed between the floating electrode layer 343 and the patterned electrode layer 342. The insulating layer 345 may be configured to provide an electrical insulation between the floating electrode layer 343 and patterned electrode layer 342. The floating electrode layer 343 may include one or more floating electrodes, which may be discrete and concentric annular (or ring-shaped) electrodes. FIG. 3F shows one ring-shaped electrode 348 (shown as two pieces in the cross-sectional view) for illustrative purposes. Additional ring-shaped electrodes that are concentric with the ring-shaped electrode 348 may be included in the SPP LC device 350. The floating electrodes may not be driven by an ohmic connection, but may be capacitively coupled to the patterned electrode layer 342. In some embodiments, the floating electrodes may be disposed at locations corresponding to the gaps 356 to cover the gaps 356. Each floating electrode may have a small overlapping area with each of two neighboring electrodes (e.g., 391 and 392) included in the patterned electrode layer 342. It is noted that the patterned electrode layer 390 shown in FIG. 3C may also be implemented in the patterned electrode layer 342 shown in FIG. 3F.

In some embodiments, the continuous phase profile in each Fresnel zone may be further divided or segmented into multiple sub-zones with a series of discrete phase levels. For example, the number of the sub-zones in each Fresnel zone may be L. The sub-zones may be substantially small and may result in significant diffraction. Such a Fresnel LC lens may be referred to as diffractive Fresnel LC lens. The diffraction efficiency of the diffractive Fresnel lens may increase as the number L of the sub-zones in each Fresnel zone increases. The electrode of a corresponding Fresnel zone may be further divided into a plurality of phase level sub-electrodes, e.g., L sub-electrodes separated from one another with gaps. The gaps between the sub-electrodes may be masked (e.g., covered by and/or filled with) a light shielding material, which may be similar to or the same as the light shielding material 158, 258, or 358. By masking the gaps between neighboring discrete sub-electrodes using the light shielding material (e.g., the black matrix), Fresnel boundary artifacts (e.g., light scattering) caused by the fringing field effect may be significantly reduced. Accordingly, the image performance of the diffractive Fresnel LC lens may be significantly improved.

Figure 4A:
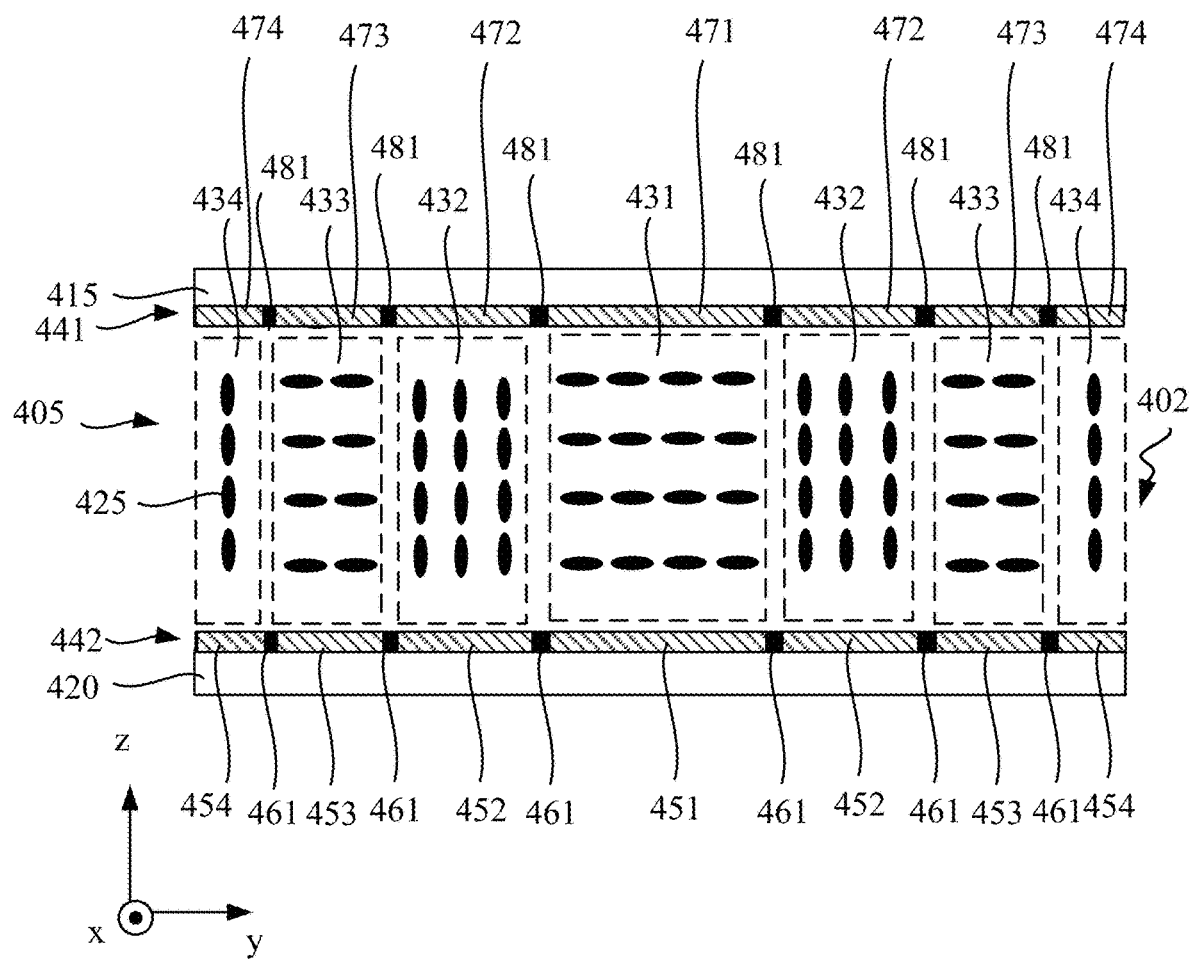
FIG. 4A schematically illustrates a diagram of an LC device, according to an embodiment of the present disclosure.

FIG. 4A schematically illustrates a y-z sectional view of an LC device 400, according to an embodiment of the present disclosure. The LC device 400 may be a Fresnel zone plate lens. Thus, for discussion purposes, the LC device 400 may also be referred to as Fresnel zone plate lens 400. The Fresnel zone plate lens 400 may include elements similar to or the same as those included in the SPP LC lens 300, 330, or 350. Descriptions of the same or similar elements can refer to the above descriptions rendered in connection with FIGS. 3A-3C, 3E, and 3F.

As shown in FIG. 4A, the Fresnel zone plate lens 400 may include a plurality of Fresnel zones of increasing radii from the center of the Fresnel zone plate lens 400. For discussion purposes, FIG. 4A shows four Fresnel zones: a first Fresnel zone 431, a second Fresnel zone 432, a third Fresnel zone 433, and a fourth Fresnel zone 434. The first Fresnel zone 431 may be a circular zone. The second to fourth Fresnel zones 432-434 may be annular (e.g., ring-shaped) zones concentric with the circular zone 431. For each annular Fresnel zone, an outer radius of an m-th (m>1) Fresnel zone may be expressed as $a_m = \sqrt{\lambda f m}$, and an inner radius of the m-th Fresnel zone may be expressed as $b_m = \sqrt{\lambda f(m-1)}$, where $\lambda$ is a design wavelength, f is the focal length of the Fresnel zone plate lens 400, and m is an integer greater than 1. The central Fresnel zone 431 can be regarded as a special case of the above mathematical equations, where m=1, i.e., the central Fresnel zone 431 has a zero inner radius. The Fresnel zones may provide phase modulations that form a lens-like wavefront. In some embodiments, two neighboring Fresnel zones may be configured to have a phase difference of a half-wave (or π) for the design wavelength λ. For example, for a linearly polarized input beam having a design wavelength λ and being polarized in the y-axis direction (e.g., a p-polarized input beam), the odd-numbered Fresnel zones 431 and 433 may be configured to provide a zero phase (retardation), and the even-numbered Fresnel zones 432 and 434 may be configured to provide a π phase (retardation). The Fresnel zone plate lens 400 may focus the linearly polarized input beam that is polarized in the y-axis direction (e.g., a p-polarized input beam) based on diffraction caused by the Fresnel zones 402.

The Fresnel zone plate lens 400 may include an LC layer 405 disposed between two substrates, a first substrate 415 and a second substrate 420. Each substrate 415 or 420 may be provided with a conductive electrode layer 441 or 442 at an inner surface. In some embodiments, the electrode layer 441 or 442 may be an ITO electrode layer. An alignment layer (not shown) may be disposed at an inner surface (a surface facing the LC layer 405) of at least one (e.g., each) of the two electrode layers 441 and 442. In some embodiments, the alignment layers may be configured with homogeneous anti-parallel alignments, e.g., one alignment in the y-axis direction, and the other alignment in the −y-axis direction. The alignment layers may homogeneously align the LC molecules 425 at a voltage-off state (e.g., V=0, power source not shown in FIG. 4A). In some embodiments, the alignment layer may be a patterned alignment layer, which may provide a homogeneous alignment in a plurality of first predetermined regions (e.g., odd-numbered Fresnel zones), and a homeotropic alignment in a plurality of second predetermined regions (e.g., even-numbered Fresnel zones). That is, the alignment layers may provide a hybrid alignment to the LC molecules 425 in the LC layer 405.

In some embodiments, each of the two electrode layers 441 and 442 may be a pattered electrode layer. For example, the first electrode layer 441 may include a central electrode 471 and a plurality of annular (ring-shaped) electrodes 472-474. The second electrode layer 442 may include a central electrode 451 and a plurality of annular (ring-shaped) electrodes 452-454. In some embodiments, each electrode in the first electrode layer 441 may be aligned with a corresponding electrode included in the second electrode layer 442, as shown in FIG. 4A. Although not shown in FIG. 4A, in some embodiments, each electrode in the first electrode layer 441 may be slightly offset from the corresponding electrode included in the second electrode layer 442.

The gaps between the electrodes 471-474 in the first patterned electrode layer 441 may be masked by a light shielding material 481. The gaps between the electrodes 451-454 in the second patterned electrode layer 442 may be masked by a light shielding material 461. Each of the light shielding material 461 and 481 may be similar to or the same as other light shielding materials disclosed herein, such as the light shielding material 158, 258, or 358. The electrodes 451-454 (or 471-474) may have widths of w1-w4 (not labeled in FIG. 4A). The widths of the electrodes in each electrode layer 441 or 442 to be different.

Figure 4B:
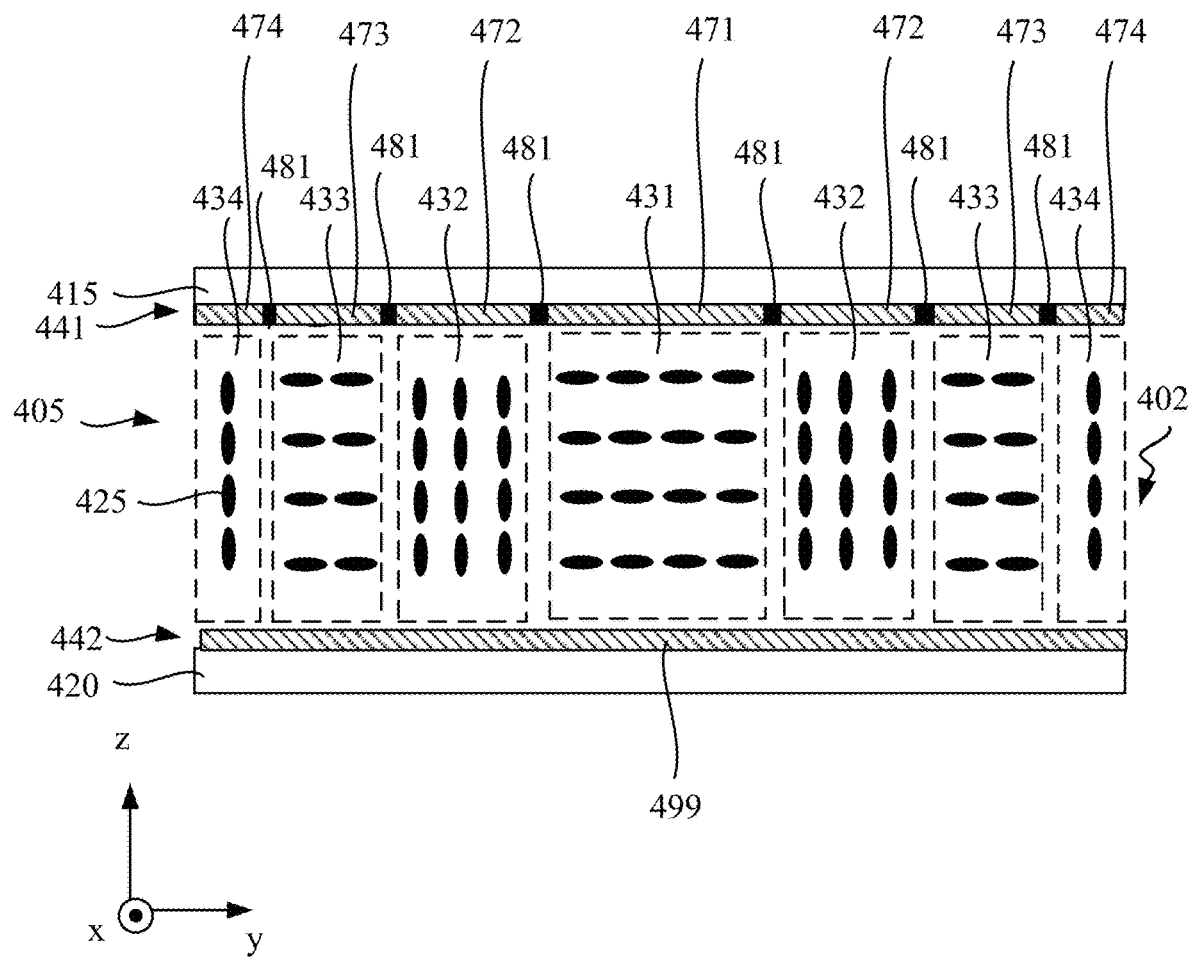
FIG. 4B schematically illustrates a diagram of an LC device, according to an embodiment of the present disclosure.

FIG. 4B schematically illustrates a diagram of an LC device 450, according to an embodiment of the present disclosure. The LC device 450 may be similar to the LC device 400, except that one of the electrode layer may be replaced with a continuous planar electrode layer 499. Detailed descriptions of the elements included in the LC device 450 may refer to the above descriptions of the LC device 400.

Figure 4C:
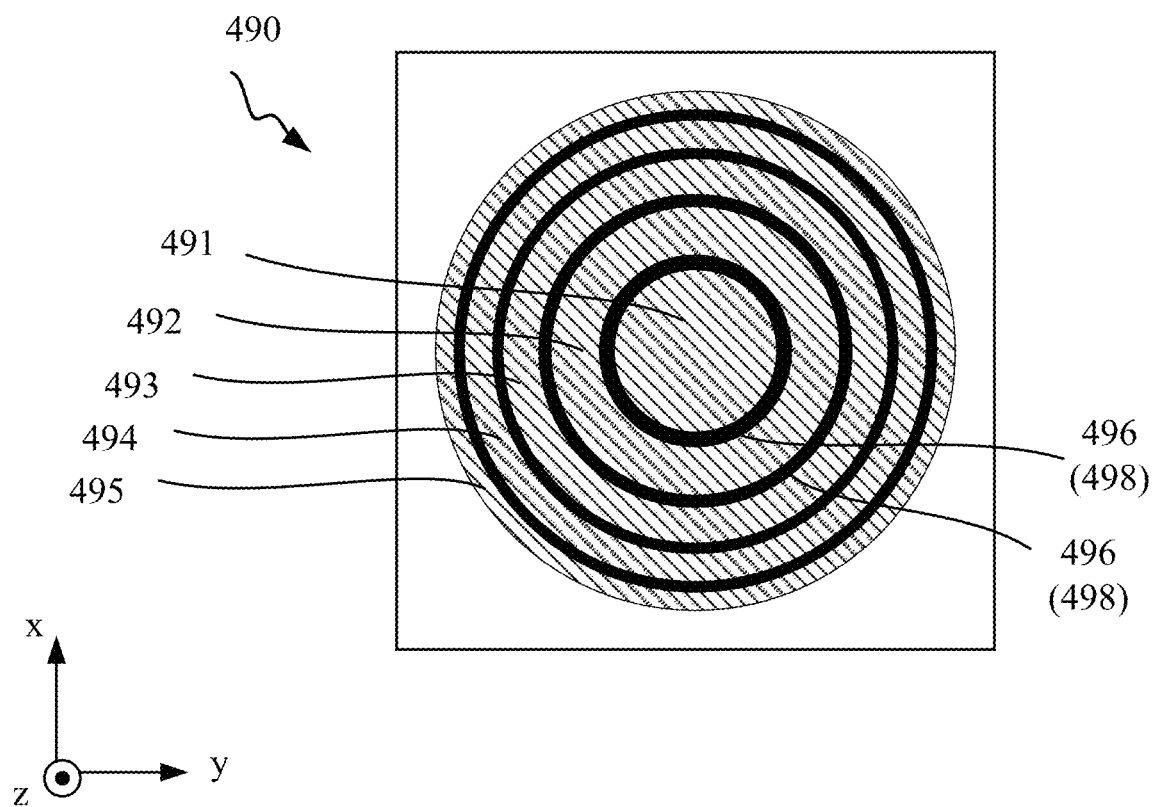
FIG. 4C schematically illustrates a diagram of a patterned electrode layer included in the LC device shown in FIG. 4A or FIG. 4B, according to an embodiment of the present disclosure.

FIG. 4C schematically illustrates an x-y sectional view of a patterned electrode layer 490, according to an embodiment of the present disclosure. The patterned electrode layer 490 may be an embodiment of the electrode layer 441 or 442 included in the Fresnel zone plate lens 400 or 450. The patterned electrode layer 490 may be similar to or the same as the patterned electrode layer 390 shown in FIG. 3C. For example, the patterned electrode layer 490 may include a plurality of electrodes including a central, circular electrode and a plurality of annular electrodes that are concentric with the central electrode. The electrodes are labelled as 491-495. The electrodes 491-494 may correspond to the plurality of Fresnel zones 431 to 434, respectively. The central electrode 491 may be a circular electrode. The annular (or ring-shaped) electrodes 492-495 may surround the central electrode 491 concentrically. In the embodiment shown in FIG. 4C, the electrodes 491-495 may have different surface areas.

The electrodes 491-495 may be spaced apart from one another with gaps 496. The gaps 496 may be masked by (e.g., covered by and/or filled with) a light shielding material 498, which may be similar to or the same as the light shielding material 158, 258, 358, 461, or 481. The gaps 496 filled with and/or covered by the light shielding material 498 may form dark regions that block a light from transmitting therethrough. For example, for a light (e.g., a visible light) incident onto the patterned electrode layer 490, the electrodes 491-495 may be configured to substantially transmit the incident light, and the dark regions may significantly attenuate or block the incident light via any suitable mechanism, e.g., absorption, reflection, etc. In some embodiments, the light shielding material 458 may include or be referred to as a black matrix.

In the embodiment shown in FIG. 4A or FIG. 4B, the alignment layer may be configured to homogeneously align the LC molecules 425 in the y-axis direction. A power source (not shown in FIG. 4A or FIG. 4B) may supply voltages to the electrodes associated with the even-numbered Fresnel zones 432 and 434 to generate a vertical electric field in the Fresnel zones 432 and 434. Directors of the LC molecules 425 in the Fresnel zones 432 and 434 may be re-oriented by the electric field to be substantially perpendicular to the substrate 415. The power source may not supply voltages to the electrodes associated with the odd-numbered Fresnel zones 431 and 433. Thus, for a linearly polarized input beam that is polarized in the y-axis direction (e.g., a p-polarized input beam), the odd-numbered Fresnel zones 431 and 433 may be configured to provide a zero phase (retardation), and the even-numbered Fresnel zones 432 and 434 may be configured to provide a π phase (retardation). The Fresnel zone plate lens 400 or 450 may focus the linearly polarized input beam that is polarized in the y-axis direction (e.g., a p-polarized input beam based on diffraction caused by the Fresnel zones. Through masking the gaps between the neighboring discrete electrodes with the light-shieling material, Fresnel boundary artifacts (e.g., light scattering) caused by the fringing field effect may be significantly reduced. Accordingly, the image performance of the Fresnel zone plate lens 400 or 450 may be significantly improved.

For illustrative and discussion purposes, the Fresnel LC lenses shown in FIGS. 3A-3C and 3E-4C function as spherical lenses. A patterned electrode layer of a spherical Fresnel LC lens may include a plurality of annular electrodes (including the circular central electrode as a special case of an annular electrode) that are separated from one another by ring-shaped gaps. The ring-shaped gaps may be masked by (e.g., covered by and/or filled with) a light shielding material configured to significantly block a light from being transmitted therethrough via any suitable mechanism, e.g., absorption, reflection, etc.

Although not shown, in some embodiments, the Fresnel LC lenses disclosed herein may function as cylindrical lenses, in which the Fresnel zones may be arranged only in one direction. For example, a patterned electrode layer of a cylindrical Fresnel LC lens may include a plurality of striped electrodes separated from one another by gaps. The gaps may be masked by (e.g., covered by and/or filled with) a light shielding material configured to significantly block a light from being transmitted therethrough via any suitable mechanism, e.g., absorption, reflection, etc. Similarly, Fresnel boundary artifacts (e.g., light scattering) caused by the fringing field effect may be significantly reduced. Accordingly, the image performance of the cylindrical Fresnel LC lens may be significantly improved.

For illustrative and discussion purposes, the GRIN LC devices shown in the figures include an upper electrode layer and a lower electrode layer, at least one of which may be a patterned electrode layer. Although not shown, in some embodiments, the GRIN LC devices disclosed herein may include only one electrode layer, which is a patterned electrode layer. For example, the patterned electrode layer may include interdigitated electrodes, which are configured to apply suitable driving voltages to the LC layer.

For illustrative and discussion purposes, the GRIN LC devices shown in the figures are transmissive devices. Although not shown, in some embodiments, the GRIN LC devices disclosed herein may also be reflective devices, or transflective devices, etc. The GRIN LC devices shown in the figures, e.g., LC-based OPAs, refractive Fresnel LC lenses, and Fresnel zone plate lenses, are for illustrative purposes to explain the mechanism for reducing the optical artifacts (e.g., light scattering) caused by the fringing field effect, thereby improving the optical performance of the GRIN LC devices. The disclosed mechanism for reducing the optical artifacts caused by the fringing field effect may be applicable to any other suitable GRIN LC devices, such as LC gratings, diffractive Fresnel LC lenses, refractive-diffractive-type Fresnel lenses, etc.

The GRIN LC devices may have numerous applications in a large variety of fields, e.g., a near-eye display ("NED"), a head-up display ("HUD"), a head-mounted display ("HMD"), smart phones, laptops, or televisions, etc. For example, the GRIN LC devices disclosed herein may be implemented in displays and optical modules for augmented reality ("AR"), virtual reality ("VR"), and/or mixed reality ("MR") display systems, to solve the vergence-accommodation conflict. Existing NEDs for VR, AR, and/or MR applications often experience vergence-accommodation conflict. The vergence-accommodation conflict arises when a stereoscopic image pair drives the vergence state of the human visual system of a user to arbitrary distances, but the accommodation or focusing state of the eyes of the user is optically driven towards a fixed distance. The vergence-accommodation conflict causes eye strain or headaches during prolonged VR/AR/MR sessions, thereby significantly degrading the visual experience of the users. In addition, different users wearing the same NED may have different accommodation abilities, due to, e.g., different ages. In general, older users have a weaker capability to accommodate than younger users. Adaptive imaging devices based on the disclosed GRIN LC devices (e.g., Fresnel LC lenses) may provide a tunable optical power, a large aperture, a sufficiently switching speed, and/or a small form factor, etc. The disclosed GRIN LC devices may efficiently drive the accommodation for different users and mitigate the vergence-accommodation conflict in NEDs.

The GRIN LC devices disclosed herein may also be implemented in displays and optical modules to enable pupil steered AR, VR, and/or MR display systems, such as holographic near eye displays, retinal projection eyewear, and wedged waveguide displays. Pupil steered AR, VR, and/or MR display systems have features such as compactness, a large field of view ("FOV"), a high system efficiency, and a small eye-box. Beam steering devices based on the disclosed GRIN LC devices may be implemented in the pupil steered AR, VR, and/or MR display systems to enlarge the eye-box spatially and/or temporally. In some embodiments, beam steering devices based on the disclosed GRIN LC devices may be implemented in AR, VR, and/or MR sensing modules to detect objects in a wide angular range to enable other functions. In some embodiments, beam steering devices based on the disclosed GRIN LC devices may be implemented in AR, VR, and/or MR sensing modules to extend the FOV (or detecting range) of the sensors, improve detecting resolution or accuracy of the sensors, and/or reduce the signal processing time. Beam steering devices based on the disclosed GRIN LC devices may also be used in optical communications, e.g., to provide fast speed (e.g., speeds at the level of Gigabyte/second) and long range (e.g., ranges at kilometer levels), microwave communications, 3D imaging and sensing (e.g., Lidar), lithography, and 3D printing, etc.

Figure 5A:
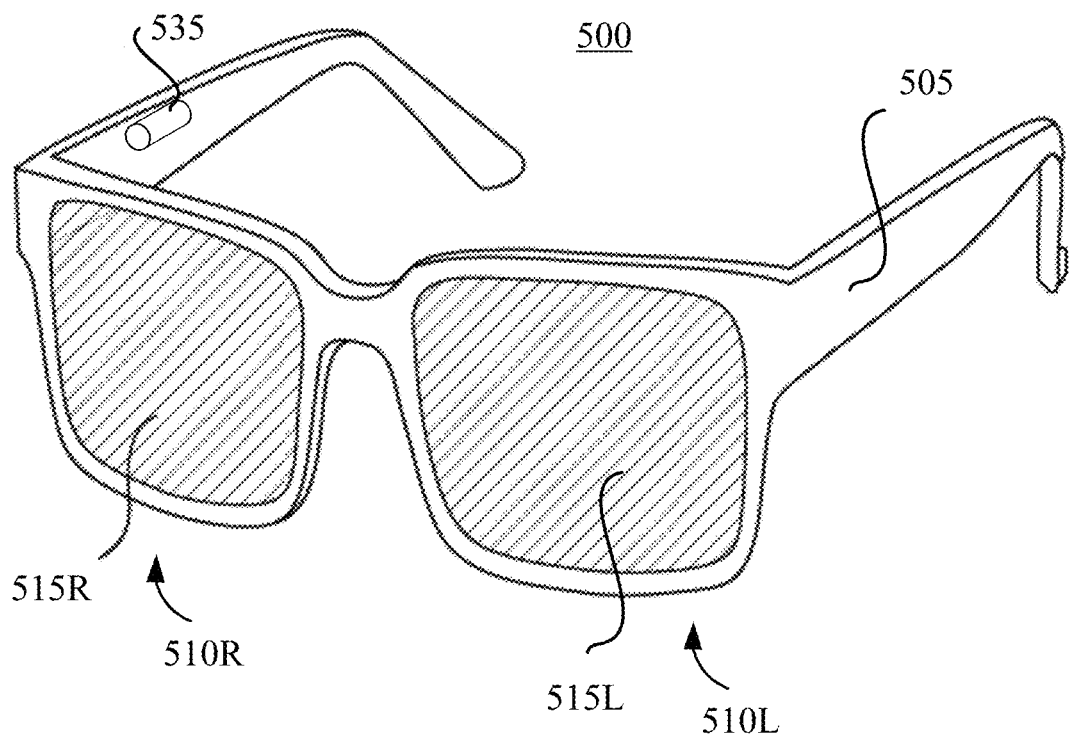
FIG. 5A schematically illustrates a diagram of a near-eye display ("NED"), according to an embodiment of the present disclosure.
Figure 5B:
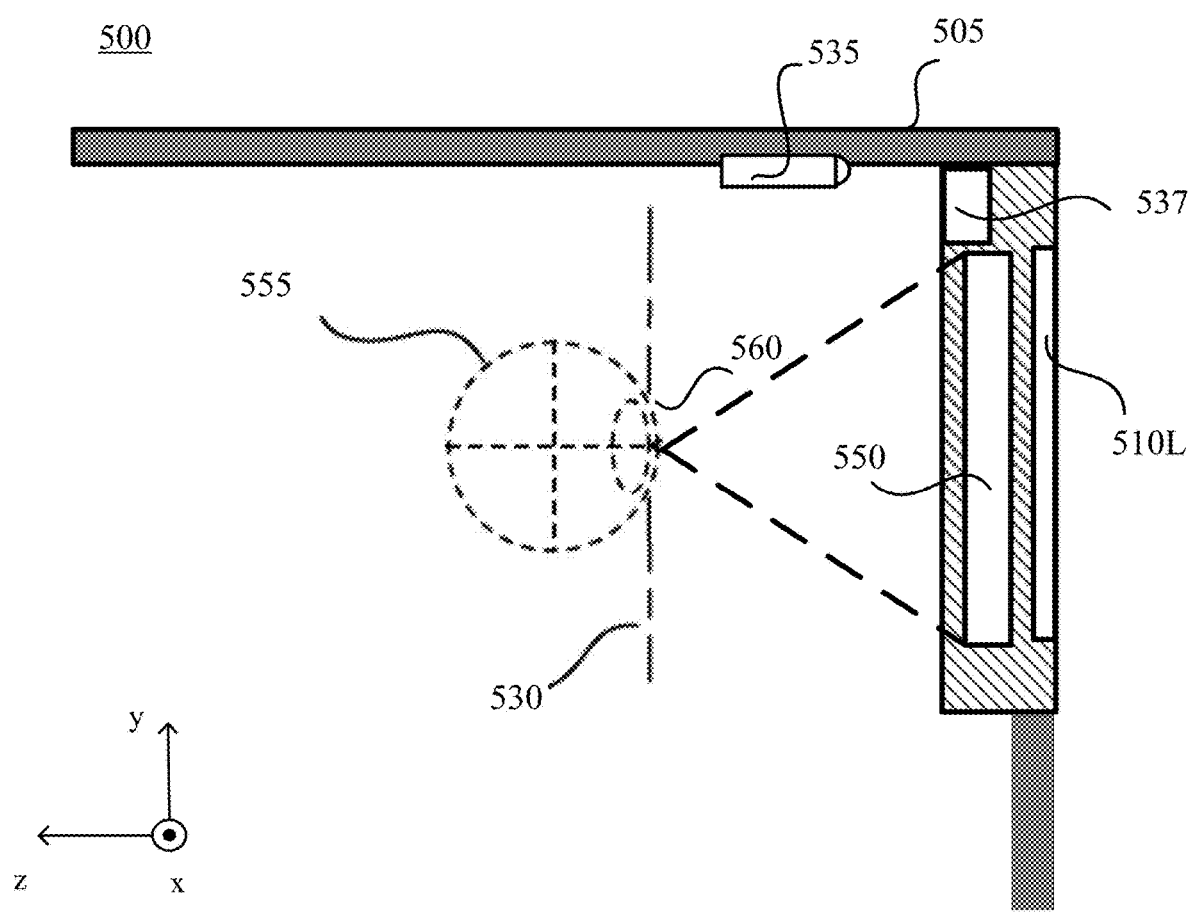
FIG. 5B schematically illustrates a cross-sectional view of half of the NED shown in FIG. 5A, according to an embodiment of the present disclosure.

FIG. 5A illustrates a schematic diagram of a near-eye display ("NED") 500 according to an embodiment of the disclosure. FIG. 5B is a cross-sectional view of half of the NED 500 shown in FIG. 5A according to an embodiment of the disclosure. For purposes of illustration, FIG. 5B shows the cross-sectional view associated with a left-eye display system 510L. As shown in FIGS. 5A and 5B, the NED 500 may include a frame 505 configured to mount to a user. The NED 500 may include right-eye and left-eye display systems 510R and 510L mounted to the frame 505. The right-eye and left-eye display systems 510R and 510L may include image display componentry configured to project computer-generated virtual images into right and left display windows 515R and 515L in a field of view ("FOV"). For illustrative purposes, FIG. 5A shows that the projection system may include a projector 535 coupled to the frame 505. The projector 535 may generate an image light representing a virtual image. As shown in FIG. 5B, the NED 500 may also include a varifocal device 550 arranged between the display system 510L and an eye of a user. The image light may be guided by the left-eye display system 510L and the varifocal device 550 to an exit pupil 560. The exit pupil 560 may be a location where an eye pupil 555 of the user is positioned in an eye-box region 530 of the left-eye display system 510L. The NED 500 may function as a VR device, an AR device, an MR device, or any combination thereof. In some embodiments, when the NED 500 functions as an AR or an MR device, the right and left display windows 515R and 515L may be entirely or partially transparent from the perspective of the user, which may provide the user with a view of a surrounding real-world environment. In some embodiments, when the NED 500 functions as a VR device, the right and left display windows 515R and 515L may be opaque, such that the user may be completely immersed in the VR imagery based on computer-generated images.

The varifocal device 550 may include one or more disclosed GRIN LC devices functioning as imaging devices, such as the SPP LC lens 300, 330, 350, 400, 450, etc. In some embodiments, the varifocal device 550 may provide optical corrections to the image light received from the left-eye display system 510L, and direct the optically corrected image light to the eye-box region 530. In addition, the varifocal device 550 may also mitigate the vergence-accommodation conflict for a variety of users, such as users having different accommodative ranges (or ranges of accommodation). Although not shown, in some embodiments, another varifocal device, separate from the varifocal device 550, may provide altered image light to another eye of the user. In some embodiments, the NED 500 may include an eye-tracking device 537 configured to provide eye-tracking information, based on which a position of the eye pupil 555 of the user may be determined. In addition, the vergence distance of the eyes may also be determined. Any suitable eye-tracking device may be used. The eye-tracking device 537 may include, e.g., one or more light sources that illuminate one or both eyes of the user, and one or more cameras that capture images of one or both eyes. The eye-tracking device 537 may be configured to track a position, a movement, and/or a viewing direction of the eye pupil 555. In some embodiments, the eye-tracking device 537 may measure the eye position and/or eye movement up to six degrees of freedom for each eye (i.e., 3D position, roll, pitch, and yaw). In some embodiments, the eye-tracking device 537 may measure a pupil size. The eye-tracking device 537 may provide a signal (or feedback) containing the position and/or movement of the eye pupil 555 to a controller (not shown in FIG. 5B). In some embodiments, the eye-tracking device 537 may include a processor configured to process the captured images and obtain eye-tracking information.

In some embodiments, the varifocal device 550 may also include one or more disclosed GRIN LC devices functioning as beam steering devices, such as the LC-based OPA 200 shown in FIG. 2A, the LC-based OPA 250 shown in FIG. 2B, or the LC-based OPA 280 shown in FIG. 2C. In some embodiments, the beam steering device (not shown in FIG. 5B) may be disposed between the varifocal device 550 and the eye pupil 555, or between the varifocal device 550 and the left-eye display system 510L. Based on dynamically eye-tracking information obtained by the eye-tracking device 537, the beam steering device may steer the image light to different spots within the eye-box region 530, thereby changing the position of the exit pupil 560 to match with the changing positions of the eye pupil 555. Accordingly, a pupil steered AR, VR, and/or MR device may be achieved.

Figure 6A:
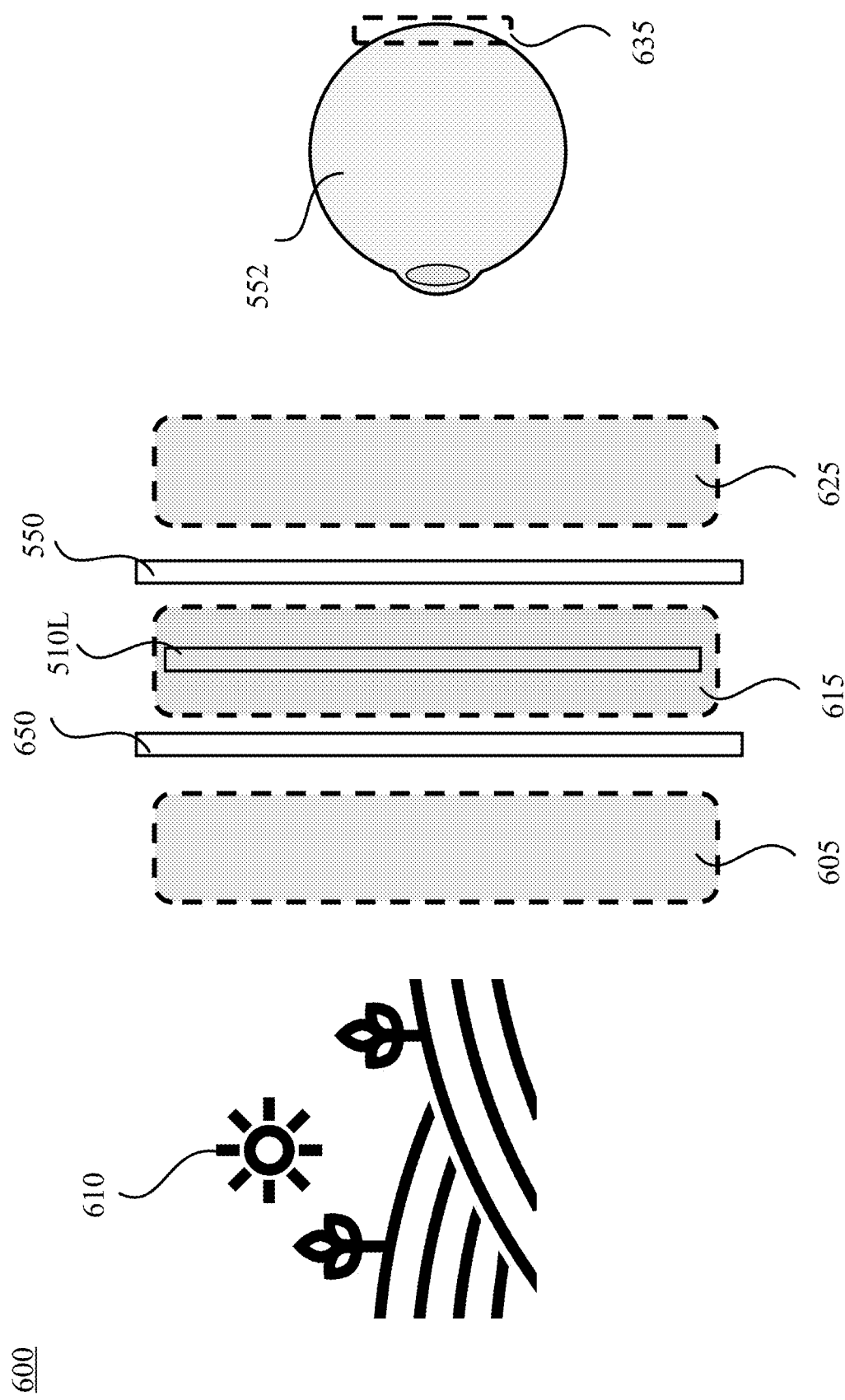
FIG. 6A schematically illustrates a diagram of a system including a GRIN LC device, according to an embodiment of the present disclosure.

FIG. 6A schematically illustrates a diagram of a system 600 including a GRIN LC device, according to an embodiment of the present disclosure. The system 600 may be a half (e.g., left half) of an NED that is similar to the NED shown in FIGS. 5A and 5B. As shown in FIG. 6A, the system 600 may include the left-eye display system 510L, a first varifocal device 550 disposed at a first side (the side closer to an eye 552) of the left-eye display system 510L, and a second varifocal device 650 disposed at a second side (the side farther away from the eye 552) of the left-eye display system 510L. When the NED is configured for AR and/or MR applications, the first varifocal device 550 and the second varifocal device 650 may be configured to have opposite optical powers, such that real-world objects 610 viewed through the NED may stay unaltered. For example, the first varifocal device 550 may be configured to provide a positive optical power (e.g., +D), and the second varifocal device 650 may be configured to a negative optical power of the same magnitude (e.g., −D) to compensate for the positive optical power provided by the first varifocal device 550. The second varifocal device 650 may image a real-world object 610 located an input field as an intermediate image located at an middle field 615, and the first varifocal device 550 may image the middle image as an output image located at an output field 625. The eye 552 of a user of the system 600 may perceive the output image when the eye 552 is located at an exit pupil within the eyebox region.

Figure 6B:
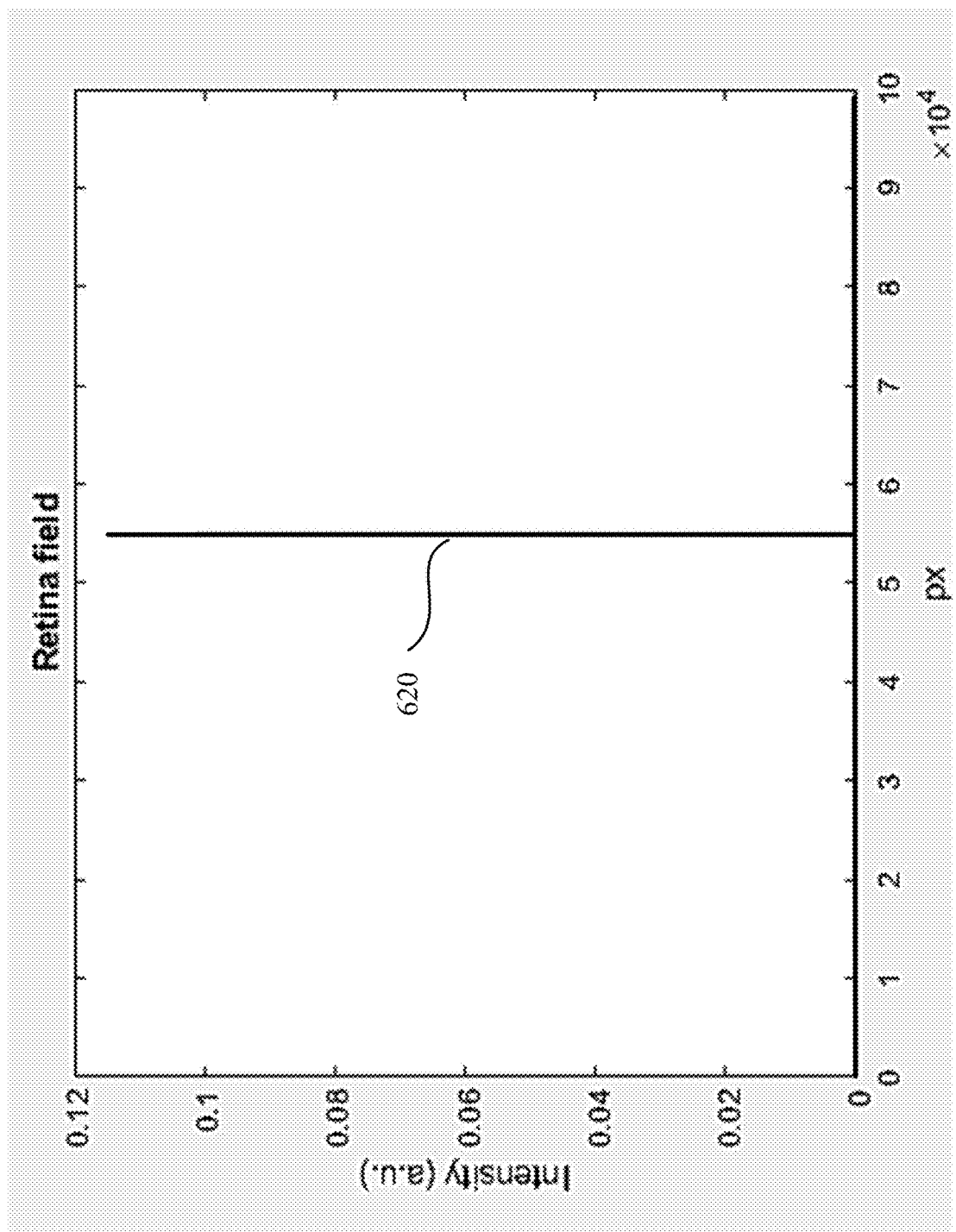
FIG. 6B illustrates a simulated image at a retinal field of a user of the system shown in FIG. 6A when the system includes one or more conventional GRIN LC devices.
Figure 6C:
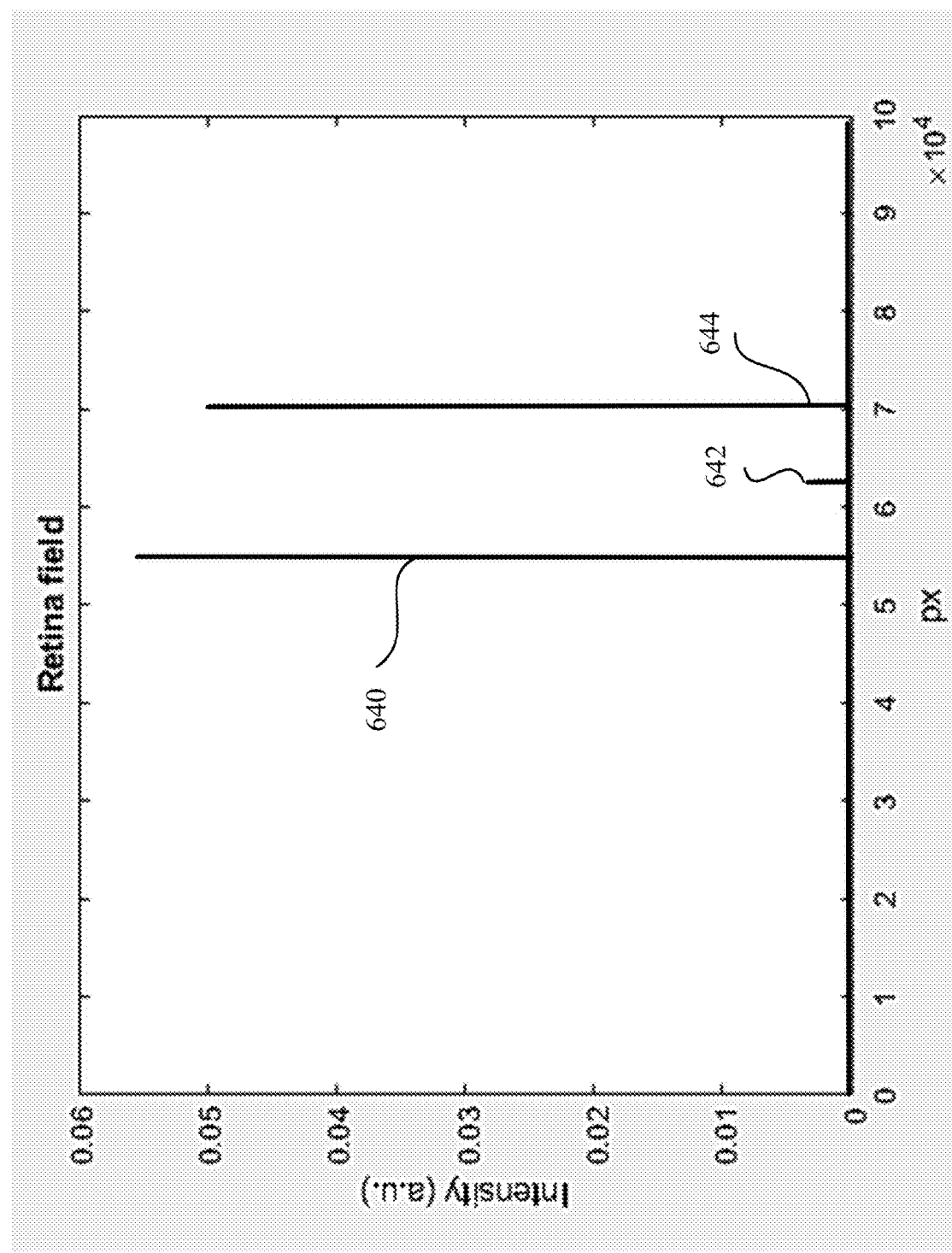
FIG. 6C illustrates a simulated image at a retinal field of a user of the system shown in FIG. 6A when the system includes one or more conventional GRIN LC devices.
Figure 6D:
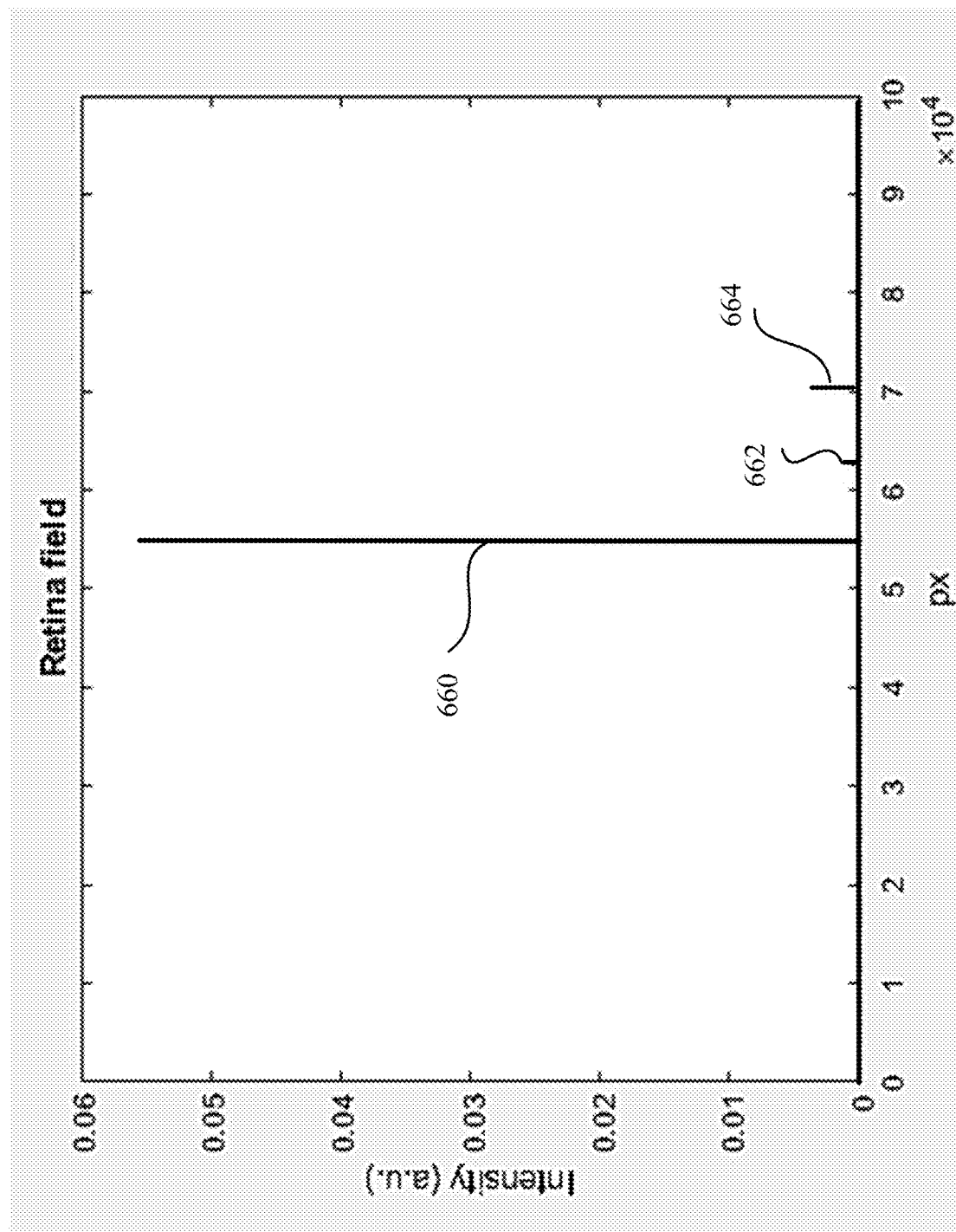
FIG. 6D illustrates a simulated image at a retinal field of a user of the system shown in FIG. 6A when the system includes one or more conventional GRIN LC devices.
Figure 6E:
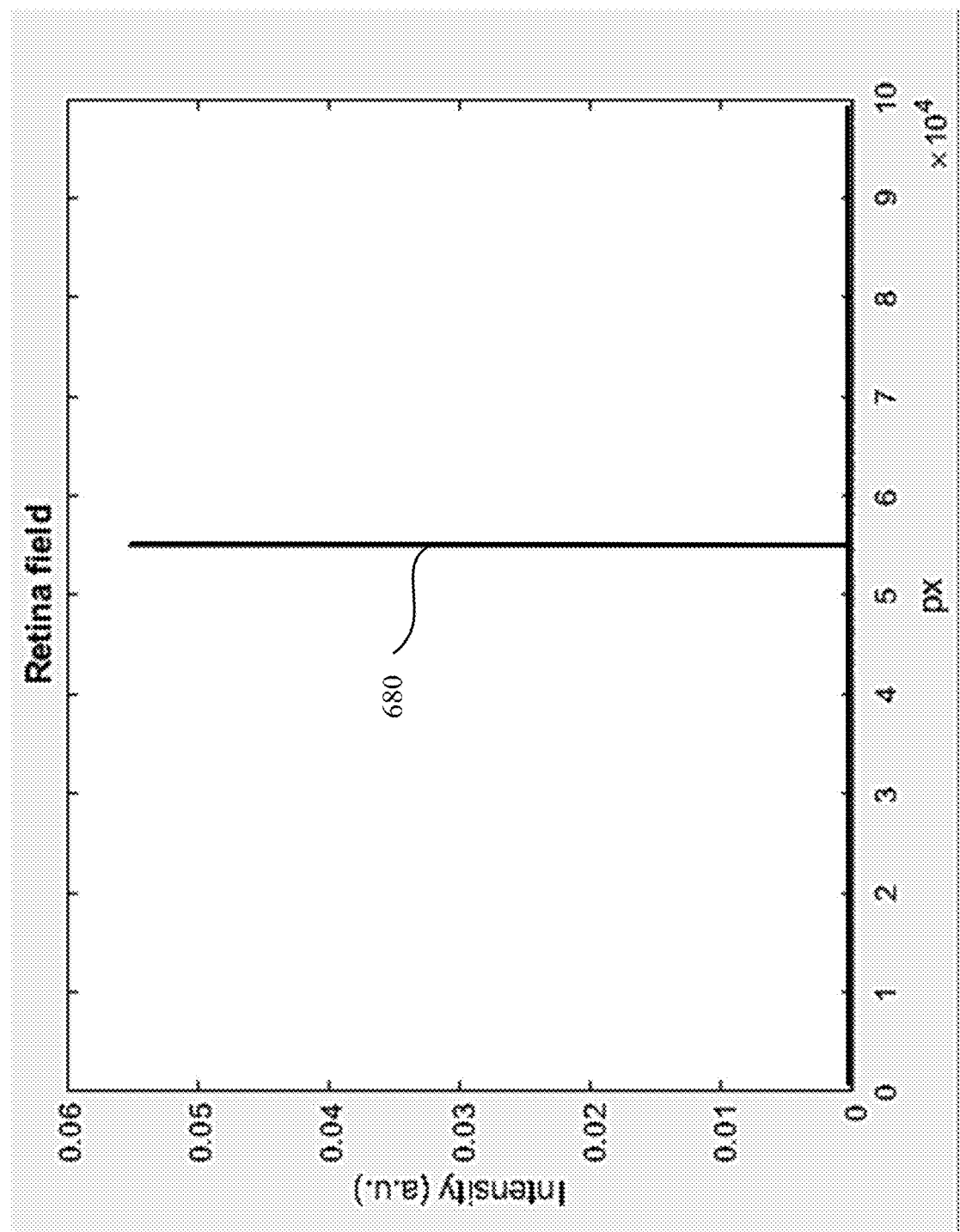
FIG. 6E illustrates a simulated image at a retinal field of a user of the system shown in FIG. 6A when the system includes one or more GRIN LC devices in accordance with embodiments of the present disclosure.

FIGS. 6B-6D illustrate various simulated images at a retinal field 635 of a user of the system shown in FIG. 6A, when the first varifocal device 550 and the second varifocal device 650 include conventional SPP LC lenses, in which the gaps between patterned electrodes are not masked. FIG. 6E illustrates a simulated image at the retina field 635 when the first varifocal device 550 and the second varifocal device 650 include one or more of the disclosed SPP LC lenses, in which the gaps between patterned electrodes are masked by a light shielding material. In the simulation, the first varifocal device 550 and the second varifocal device 650 each includes an SPP LC lens (also referred to as 550 or 650 for discussion purposes). The SPP LC lens 550 or 650 includes eight Fresnel resets, and has an aperture of about 10 mm. The width of the gap between neighboring patterned electrodes is about 6 When the SPP LC lenses 550 and 650 are conventional SPP LC lenses, the gaps between patterned electrodes are not masked. The light transmittance of the gaps and electrodes are considered as 100%. When the SPP LC lenses 550 and 650 are disclosed SPP LC lenses, e.g., those shown in FIG. 3A, the gaps between patterned electrodes are masked by a light shielding material. The width of the light shielding material is substantially equal to the width of the gap, i.e., 6 μm. The light transmittance of the electrodes is considered as 100%, and the light transmittance of the gap masked with the light shielding material is considered as 0.

FIG. 6B illustrates a simulated image at the retinal field 635 of a user of the system 600 shown in FIG. 6A. The SPP LC lenses 550 and 650 presumed to be conventional SPP LC lenses, in which the fringing field effect is not accounted for, for example, when the fringing field is substantially weak and negligible, or when the fringing field effect does not exist (e.g., in theory). The horizontal axis and the vertical axis represent lateral position (unit: μm) and light intensity (unit: arbitrary unit (a.u.)), respectively. As shown in FIG. 6B, a straight line 620 is perceived at the retinal field. The straight line 620 is located substantially in the middle of the retinal field, representing a signal image (e.g., an image of a real-world object) with an intensity of about 0.118 a.u.

FIGS. 6C and 6D illustrate simulated images at the retinal field 635 of a user of the system 600 shown in FIG. 6A. The SPP LC lenses 550 and 650 are presumed to be conventional SPP LC lenses, in which the fringing field effect is strong. That is, the fringing field effect is not negligible and causes optical artifacts (e.g., light scattering), which may be the case in many practical applications. As shown in FIG. 6C, according to the modeling of noise grating (blaze grating), three straight lines 640, 642, and 644 are perceived at the retinal field. The straight line 640 is located substantially in the middle of the retinal field, representing a signal image (e.g., an image of a real-world object) with an intensity of about 0.055 a.u. The two straight lines 642 and 644 located next to the straight line 640 represent the noise (e.g., ghost images) caused by the fringing field effect. The two ghost images have intensities of about 0.004 a.u. and 0.05 a.u., respectively. The ghost images may degrade the image quality of the system 600. The shape of the noise may vary according to the actual LC structure formed at the phase reset.

As shown in FIG. 6D, according to the modeling of noise grating (random grating), three straight lines 660, 662, and 664 are perceived at the retinal field. The straight line 660 is located substantially in the middle of the retinal field, representing a signal image (e.g., an image of a real-world object) with an intensity of about 0.055 a.u. The two straight lines 662 and 664 located next to the straight line 660 represent the noise (e.g., ghost images) caused by the fringing field effect. The two ghost images have intensities of about 0.002 a.u. and 0.005 a.u., respectively. The shape of the noise may vary according to the actual LC structure formed at the phase reset. Comparing FIG. 6C and FIG. 6D, although the intensities of the noise are reduced as shown in FIG. 6D, the ghost images may be still perceived at the retinal field.

FIG. 6E illustrates a simulated image at the retinal field 635 of a user of the system 600 shown in FIG. 6A. The SPP LC lenses 550 and 650 are the disclosed SPP LC lenses, in which the gaps between patterned electrodes are masked by a light shielding material. The width of the light shielding material is about 6 μm.

The fringing field effect is strong and not negligible in the disclosed SPP LC lenses. As shown in FIG. 6E, a straight line 680 is perceived at the retinal field. The straight line 680 is located substantially in the middle of the retinal field, representing a signal image (e.g., an image of a real-world object) with an intensity of about 0.055 a.u. Straight lines representing noise (e.g., ghost images) are not perceived at the retinal field. That is, by masking the gaps between neighboring patterned electrodes with the light shielding material, the noise caused by the fringing field effect may be significantly reduced or suppressed in an output light of the SPP LC lenses.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an element, a controller, an electrical circuit, a logic gate, etc.

Further, when an embodiment illustrated in a drawing shows a single element, it is understood that the embodiment or another embodiment not shown in the figures but within the scope of the present disclosure may include a plurality of such elements. Likewise, when an embodiment illustrated in a drawing shows a plurality of such elements, it is understood that the embodiment or another embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:
a liquid crystal ("LC") layer having a gradient refractive index distribution; and
an electrode layer coupled to the LC layer,
wherein the electrode layer includes a plurality of electrodes separated by one or more gaps masked by a light shielding material, and
wherein each gap includes an opening facing the LC layer, and the light shield material is located at the opening facing the LC layer to block a light from transmitting through the opening into the LC layer.

2. The device of claim 1, wherein the one or more gaps are filled with the light shielding material.

3. The device of claim 1, wherein the one or more gaps are covered by the light shielding material.

4. The device of claim 1, wherein the one or more gaps are filled with and covered by the light shielding material.

5. The device of claim 1, wherein the light shielding material is configured to substantially absorb a light within a predetermined wavelength range.

6. The device of claim 1, wherein the light shielding material is configured to substantially reflect a light within a predetermined wavelength range.

7. The device of claim 1, wherein a width of the light shielding material is in a range of about 300 nm to about 3 μm.

8. The device of claim 1, wherein the light shielding material includes at least one of an organic material or an inorganic material.

9. The device of claim 1, wherein the light shielding material includes at least one a resin, a metal, or a polymer doped with dyes.

10. The device of claim 1, wherein the gradient refractive index distribution of the LC layer is in a direction perpendicular to a thickness direction of the LC layer.

11. The device of claim 1, wherein the plurality of electrodes are stripe-shaped electrodes arranged in parallel, or concentric discrete electrodes.

12. The device of claim 1, wherein the electrode layer is a first electrode layer, the device further comprises a second electrode layer disposed opposite to the first electrode layer.

13. The device of claim 12, wherein the second electrode layer includes a continuous planar electrode.

14. The device of claim 12,
wherein the electrodes included in the first electrode layer are first electrodes, the one or more gaps between the first electrodes are first gaps, and
the second electrode layer includes a plurality of second electrodes separated by one or more second gaps.

15. The device of claim 14, wherein the one or more second gaps are masked by the light shielding material.

16. The device of claim 14, wherein the second electrodes included in the second electrode layer are substantially aligned with the first electrodes included in the first electrode layer.

17. The device of claim 1, wherein the light shielding material is in direct contact with the electrodes.

18. The device of claim 1, wherein the device is one of a Fresnel LC lens, an LC grating, or an optical phased array.

19. The device of claim 1, wherein the electrodes are configured to substantially transmit a light incident onto the electrode layer, and the light shielding material is configured to substantially block the light incident onto the electrode layer from being transmitted through the one or more gaps into the LC layer.

20. A device, comprising:
a liquid crystal ("LC") layer having a gradient refractive index distribution;
a first electrode layer coupled to the LC layer; and
a second electrode layer disposed opposite to the first electrode layer,
wherein the first electrode layer includes a plurality of first electrodes separated by one or more first gaps masked by a light shielding material, each first gap includes an opening facing the LC layer, and the light shield material covers the opening facing the LC layer to block a light from transmitting through the first gap into the LC layer,
wherein the second electrode layer includes a plurality of second electrodes separated by one or more second gaps, and
wherein the second electrodes included in the second electrode layer are partially offset from the first electrodes included in the first electrode layer.

* * * * *